(12) United States Patent
Morimoto et al.

(10) Patent No.: US 7,999,777 B2
(45) Date of Patent: Aug. 16, 2011

(54) LIQUID CRYSTAL DISPLAY DEVICE

(75) Inventors: Masateru Morimoto, Mobara (JP); Yasuyuki Yamada, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 530 days.

(21) Appl. No.: 12/262,203

(22) Filed: Oct. 31, 2008

(65) Prior Publication Data

US 2009/0115712 A1    May 7, 2009

(30) Foreign Application Priority Data

Nov. 1, 2007    (JP) ................ 2007-285182

(51) Int. Cl.
*G09G 3/36* (2006.01)
(52) U.S. Cl. ............ 345/87; 349/128; 349/144
(58) Field of Classification Search .......... 345/87, 345/93, 613; 349/128, 130, 139, 141, 143, 349/144, 147, 145; 438/30; 257/59
See application file for complete search history.

(56) References Cited

U.S. PATENT DOCUMENTS

2007/0153197 A1 *  7/2007  Park et al. ............ 349/141

* cited by examiner

*Primary Examiner* — Abbas Abdulselam
(74) *Attorney, Agent, or Firm* — Antonelli, Terry, Stout & Kraus, LLP.

(57) ABSTRACT

A liquid crystal display device includes a liquid crystal display panel having a first substrate, a second substrate, and a positive liquid crystal sandwiched between the first and second substrates. The liquid crystal display panel includes a plurality of sub pixels which include a first electrode and a second electrode formed on the first substrate. The liquid crystal display panel is configured to drive the liquid crystal by generating an electric field using a difference in potential between the first electrode and the second electrode. The first substrate includes a first alignment film, a plurality of video lines, and a first polarizer, and the second substrate includes a second alignment film, and a second polarizer. Relationships exist among extension directions of the video lines and directions of alignment axis orthogonal thereto, of the alignment films a polarization axis of at least one of the polarizer, and angles therebetween.

41 Claims, 13 Drawing Sheets

LIQUID CRYSTAL DISPLAY DEVICE

The present application claims priority from Japanese application JP2007-285182 filed on Nov. 1, 2007, the content of which is hereby incorporated by reference into this application.

BACKGROUND OF THE INVENTION

1. Field of the Invention

The present invention relates to a liquid crystal display device, and more particularly to a liquid crystal display device which includes a means for overcoming problems attributed to polarization sunglasses.

2. Description of the Related Art

A TFT-type liquid crystal display panel which uses a thin film transistor as an active element can display a high-definition image and hence, such a liquid crystal display panel has been used as a display device of a television receiver set, a personal computer display or the like. Particularly, a miniaturized TFT-type liquid crystal display device has been popularly used as a display part of a mobile phone.

On the other hand, as such a TFT-type liquid crystal display panel, a vertical-electric-field-type (for example, TN-type, ECB-type, VA-type or the like) liquid crystal display panel, and a lateral-electric-field-type (also referred to as IPS-method) liquid crystal display panel have been known. It is also known that the IPS-method liquid crystal display panel can acquire a broad viewing angle.

In general, the IPS-method liquid crystal display panel is constituted of a first substrate (hereinafter also referred to as a TFT substrate), a second substrate (hereinafter also referred to as a counter substrate), and liquid crystal sandwiched between the first substrate and the second substrate. The first substrate includes a first alignment film arranged on the liquid-crystal-side surface thereof and a first polarizer arranged on the surface thereof opposite to the liquid crystal, while the second substrate includes a second alignment film arranged on a liquid-crystal-side surface thereof and a second polarizer arranged on a surface thereof on a side opposite to the liquid crystal.

Further, on the liquid crystal display panel, within a region surrounded by two neighboring scanning lines (also referred to as gate lines) and two neighboring video lines (also referred to as drain lines), a thin film transistor which is turned on in response to a scanning signal from a scanning line and a pixel electrode to which a video signal from a video line is supplied via the thin film transistor are formed thus constituting a so-called sub pixel.

Conventionally, on the IPS-method liquid crystal display panel, video lines (DL) are arranged so as to be parallel to either one of long sides or short sides of a rectangular display region, and scanning lines (GL) are arranged orthogonal to the video lines (DL).

Further, an alignment axis (or a rubbing direction) of the first alignment film and an alignment axis of the second alignment film are set to the same direction, and linear portions of a pixel electrode (PX) are formed such that a narrow angle out of intersecting angles between the alignment axis of the first alignment film (or the alignment axis of the second alignment film) and an extension direction of the linear portions of the pixel electrode (PX) assumes a predetermined angle (hereinafter referred to as a pre-twist angle, being set to a value ranging from approximately −20° to 20°).

Further, an absorption axis of the first polarizer and an absorption axis of the second polarizer are set to be orthogonal to each other and, at the same time, either one of the absorption axis of the first polarizer and the absorption axis of the second polarizer is set to agree with the alignment axis of the first alignment film and the alignment axis of the second alignment film.

As described previously, it has been known that the IPS-method liquid crystal display panel can acquire a broad viewing angle. Recently, as a technique which further increases a viewing angle of the IPS-method liquid crystal display panel, there has been known a liquid crystal display device of a type which divides each sub pixel into two regions, and imparts electric fields of different directions to liquid crystal in respective regions (also referred to as a multi-domain-type liquid crystal display device). On the other hand, a liquid crystal display device of a type which imparts an electric field only in one direction without dividing each sub pixel into two regions is referred to as a single-domain-type liquid crystal display device. The multi-domain-type liquid crystal display device exhibits excellent viewing angle characteristic compared to the single-domain-type liquid crystal display device.

FIG. 11 is a view for explaining one example of the electrode structure of a conventional multi-domain-type liquid crystal display panel adopting an IPS method.

In the electrode structure shown in FIG. 11, a counter electrode not shown in the drawing is formed in a planar shape, and a pixel electrode (PX) is formed of an electrode having a plurality of slits (SLT). Portions which are divided by the slits (SLT) form linear portions (comb-teeth electrodes) (KSB) of the pixel electrode (PX). The pixel electrode (PX) and the counter electrode are formed of a transparent conductive film made of ITO (Indium Tin Oxide) or the like, for example. In FIG. 11, an extension direction of the linear portions (KSB) of the pixel electrode (PX) extends in a direction of short sides out of long sides and short sides of each sub pixel.

Further, the pixel electrode (PX) having the linear portions and the planar counter electrode are stacked to each other with an interlayer insulation film sandwiched therebetween. By generating arcuate lines of electric force generated between the pixel electrodes (PX) and the counter electrode such that the lines of electric force are distributed in the liquid crystal layer in a penetrating manner thus changing the alignment of the liquid crystal display layer (LC).

In FIG. 11, the initial alignment direction (HLC) of the liquid crystal is set parallel to the extension direction of the scanning lines (GL). Further, a region of each sub pixel is divided in two (two regions ARA, ARB in FIG. 11), and the slits (SLT) formed in the divided region ARA and the slits (SLT) formed in the divided region ARB are formed in line symmetry with respect to the initial alignment direction (HLC) of the liquid crystal.

Due to such constitution, by setting a rotational direction of liquid crystal molecules in the region ARA and a rotational direction of liquid crystal molecules in the region ARB opposite to each other with respect to a direction of the electric field applied between the pixel electrode (PX) and the counter electrode (CT), a wide viewing angle can be realized.

FIG. 12 is a plan view for explaining another example of the electrode structure of a conventional liquid crystal display panel of a multi-domain-type adopting an IPS method.

In the electrode structure shown in FIG. 12, the extension direction of the linear portions (KSB) of the pixel electrode (PX) extends in the direction of long sides out of the long sides and the short sides of each sub pixel. Further, an initial alignment direction (HLC) of liquid crystal is arranged parallel to the extension direction along which the video line (DL) extends as a whole (although the video line (DL) extends while being bent, the extension direction along which the video line (DL) extends as a whole, in this specification, does not imply the extension direction of a local portion of the video line (DL) but implies the direction along which the video line (DL) extends as a whole). Further, a region of each sub pixel is divided into two regions (the region ARA and the region ARB in FIG. 12) using a center line Lcen as a boundary, wherein slits (SLT) make an inclination angle with respect to the center line Lcen different from each other between the divided region ARA and the divided region ARB such that the slits (SLT) face each other in an opposed manner with the center line Lcen sandwiched therebetween.

Due to such constitution with respect to the direction of an electric field applied between the pixel electrode PX and the counter electrode CT, a rotational direction of liquid crystal molecules in the region ARA and a rotational direction of the liquid crystal molecules in the region ARB are set opposite to each other thus realizing a broad viewing angle.

In both cases shown in FIG. 11 and FIG. 12, the pixel electrodes (PX) and the counter electrode are formed together on the same substrate, and electric fields are generated due to differences in potential between the pixel electrodes (PX) and the counter electrode thus driving liquid crystal.

In FIG. 11 and FIG. 12, symbol a-Si indicates a semiconductor layer, symbol CH indicates a contact hole for connecting a conductive layer (SD) which functions as a source electrode and a pixel electrode (PX), and symbol CHK indicates an opening portion formed in the counter electrode. Although each slit (SLT) shown in FIG. 11 and FIG. 12 has both ends thereof closed, one end of the slit (SLT) may be opened.

SUMMARY OF THE INVENTION

With respect to sunglasses, there exist sunglasses having polarization characteristic, and such polarization sunglasses have an absorption axis in the lateral direction. Accordingly, when an absorption axis of a polarizer on a viewer's side becomes orthogonal to the absorption axis of the polarization sunglasses, when a viewer wears the polarization sunglasses, there arises a situation where the viewer cannot observe an image. Further, when the absorption axis of the polarizer is slightly displaced from the direction orthogonal to the absorption axis of the polarization sunglasses, there arises a drawback that a display is darkened.

By arranging the absorption axis of the polarizer on a viewer's side and the absorption axis of the polarization sunglasses parallel to each other, such a drawback that a display is darkened can be obviated. However, recently, in a technical field such as a PC monitor or a personal digital assistant or the like, for example, there has been known a liquid crystal display device which allows the viewer to use the liquid crystal display device by rotating a liquid crystal display panel by 90°. In this case, however, when the viewer wears the polarization sunglasses, there arises a drawback that a display becomes darkened either before or after the rotation of the liquid crystal display panel.

To cope with such a drawback attributed to the polarization sunglasses, it is necessary to set the absorption axis of the polarizer on a viewer's side to a value which falls within a range from 10° to 80° or within a range from −10° to −80° displaced from 0° and 90° by 10° or more, and desirably a value which falls within a range from 30° to 60° or within a range from −30° to −60° displaced from 30° or more. It is desirable to set the absorption axis of the polarizer on a viewer's side to a value which falls within a range from 30° to 60° away from 0° and 90° by 30° or more or a value which falls within a range from −30° to −60°. Here, 0° indicates the extension direction of the video lines (DL) (the direction along which the video lines (DL) extend as a whole when the video lines (DL) are bent), and 900 indicates the direction orthogonal to the extension direction of the video lines (DL) (the direction along which the video lines extend as a whole when the video lines (DL) are bent). These angles are angles measured from 0° in the clockwise direction. Further, in this specification, the absorption axes, the alignment axis and the extension direction are not vectors and hence, the direction of 0° is equal to the directions of ±180°, and the direction of 90° is equal to the direction of −90°.

In case of a liquid crystal display panel of a vertical electric field-type, the direction of absorption axis of the polarizer on a viewer's side has a high-degree of freedom in designing. However, in case of the liquid crystal display panel adopting an IPS-method, due to reasons such as a control of the rotational directions of the liquid crystal molecules, it is necessary to incline the alignment axes of the first alignment film and the second alignment film by a pre-twist angle with respect to the extension direction of the linear portions of the pixel electrode thus giving rise to a drawback peculiar to the liquid crystal display panel of IPS-method that the direction of the absorption axis of the polarizer on a viewer's side cannot be arranged irrelevant to the extension direction of the linear portions of the pixel electrode.

Here, the single-domain-type is adopted as a mode of the IPS-method, the liquid crystal display panel may have the structure that the alignment axis of the alignment film on a viewer's side and the absorption axis of the polarizer on a viewer's side are displaced from the above-mentioned direction of 0° or 90° by an amount of the pre-twist angle.

However, the multi-domain-type is adopted as a mode of the IPS-method, as explained in conjunction with FIG. 11 and FIG. 12, the alignment axis of the alignment film on a viewer's side and the absorption axis of the polarizer on a viewer's side are set to the direction of 0° or 90° and hence, when the viewer wears polarization sunglasses, there may be a case that a viewer can hardly observe a display.

The present invention has been made to overcome the above-mentioned drawbacks of the related art, and it is an object of the present invention to provide a technique which can set an absorption axis of a polarizer on a viewer's side to an arbitrary direction to cope with drawbacks attributed to polarization sunglasses.

The above-mentioned and other objects and novel features of the present invention will become apparent from the description of this specification and attached drawings.

To simply explain typical inventions among the inventions disclosed in this specification, they are as follows.

(1) According to a first aspect of the present invention, there is provided a liquid crystal display device including a liquid crystal display panel which comprises: a first substrate; a second substrate arranged closer to a viewer's side than the first substrate; and positive liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of video lines configured to input a video signal to the respective sub pixels; and a first polarizer arranged on a surface thereof opposite to the liquid crystal, the second substrate includes: a second alignment film arranged on the liquid-crystal-side surface thereof; and a second polarizer arranged on the surface thereof opposite to the liquid crystal, the first electrode includes linear portions A and linear portions B which extend in a direction along short sides out of long sides and the short sides of each sub pixel, the video lines extend in a first direction along an arbitrary one side of the display region of the liquid crystal display panel as a whole while being bent locally, and assuming the first direction as a first reference direction and a direction orthogonal to the first direction as a second reference direction, assuming a narrow angle out of intersection angles between the first reference direction and the extension direction of a portion of the video line as θ1, assuming a narrow angle out of intersection angles between the second reference direction and an alignment axis of the second alignment film as θ2, assuming a narrow angle out of intersection angles between the alignment axis of the second alignment film and an extension direction of the linear portions A of the first electrode as θ3, assuming a narrow angle out of intersection angles between the alignment axis of the second alignment film and an extension direction of the linear portions B of the first electrode as θ4, assuming a narrow angle out of intersection angles between the second reference direction and an absorption axis of the second polarizer as θ5, and in measuring the angles θ1 to θ5 within a range from −90° to +90° while setting a clockwise direction as a normal direction, wherein the angle θ1 is measured from the first reference direction, the angles θ2, θ5 are measured from the second reference direction, and the angles θ3, θ4 are measured from the alignment axis of the second alignment film respectively, a sign of the angle θ1 and a sign of the angle θ2 are equal within one sub pixel, a sign of the angle θ3 and a sign of the angle θ4 are opposite to each other within one sub pixel, the angles θ1 of all sub pixels have the same sign, and following formulae (1) to (6) are satisfied in all sub pixels.

$$0° \leq |\theta1-\theta2| \leq 2° \quad (1)$$

$$10° \leq |\theta2| \leq 80° \quad (2)$$

$$1° \leq |\theta3| \leq 20° \quad (3)$$

$$1° \leq |\theta4| \leq 20° \quad (4)$$

$$0° \leq |\theta3-\theta4| \leq 2° \quad (5)$$

$$0° \leq |\theta2-\theta5| \leq 2° \text{ or } 88° \leq |\theta2-\theta5| \leq 92° \quad (6)$$

(2) According to a second aspect of the present invention, there is provided a liquid crystal display device including a liquid crystal display panel which comprises: a first substrate; a second substrate arranged closer to a viewer's side than the first substrate; and negative liquid crystal sandwiched between the first electrode and the second electrode, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of video lines configured to input a video signal to the respective sub pixels; and a first polarizer arranged on a surface thereof opposite to the liquid crystal, the second substrate includes: a second alignment film arranged on the liquid-crystal-side surface thereof; and a second polarizer arranged on the surface thereof opposite to the liquid crystal, the first electrode includes linear portions A and linear portions B which extend in a direction along short sides out of long sides and the short sides of each sub pixel, the video lines extend in a first direction along an arbitrary one side of the display region of the liquid crystal display panel as a whole while being bent locally, and assuming the first direction as a first reference direction and a direction orthogonal to the first direction as a second reference direction, assuming a narrow angle out of intersection angles between the first reference direction and the extension direction of a portion of the video line as θ1, assuming a narrow angle out of intersection angles between the second reference direction and a direction orthogonal to an alignment axis of the second alignment film as Θ2, assuming a narrow angle out of intersection angles between a direction orthogonal to the alignment axis of the second alignment film and an extension direction of the linear portions A of the first electrode as Θ3, assuming a narrow angle out of intersection angles between a direction orthogonal to the alignment axis of the second alignment film and an extension direction of the linear portions B of the first electrode as Θ4, assuming a narrow angle out of intersection angles between the second reference direction and an absorption axis of the second polarizer as θ5, and in measuring the angles θ1, Θ2, Θ3, Θ4, θ5 within a range from −90° to +90° while setting a clockwise direction as a normal direction respectively, wherein the angle θ1 is measured from the first reference direction, the angles Θ2, θ5 are measured from the second reference direction, and the angles Θ3, Θ4 are measured from the direction orthogonal to the alignment axis of the second alignment film, a sign of the angle θ1 and a sign of the angle Θ2 are equal within one sub pixel, a sign of the angle Θ3 and a sign of the angle Θ4 are opposite to each other within one sub pixel, the angles θ1 of all sub pixels have the same sign, and following formulae (1) to (6) are satisfied in all sub pixels.

$$0° \leq |\theta1-\Theta2| \leq 2° \quad (1)$$

$$10° \leq |\Theta2| \leq 80° \quad (2)$$

$$1° \leq |\Theta3| \leq 20° \quad (3)$$

$$1° \leq |\Theta4| \leq 20° \quad (4)$$

$$0° \leq |\Theta3-\Theta4| \leq 2° \quad (5)$$

$$0° \leq |\Theta2-\theta5| \leq 2° \text{ or } 88° \leq |\Theta2-\theta5| \leq 92° \quad (6)$$

(3) According to a third aspect of the present invention, there is provide a liquid crystal display device including a liquid crystal display panel which comprises: a first substrate; a second substrate arranged closer to a viewer's side than the first substrate; and positive liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on the liquid-crystal-side surface thereof; and a first polarizer arranged on the surface thereof opposite to the liquid crystal, the second substrate includes: a second alignment film arranged on a liquid-crystal-side surface thereof; and a second polarizer arranged on the surface thereof opposite to the liquid crystal, the first electrode includes linear portions A and linear portions B which extend in a direction along long sides out of long sides and the short sides of each sub pixel, and assuming a first direction along an arbitrary one side of the display region as a reference direction, assuming a narrow angle out of intersection angles between the reference direction and an alignment axis of the second alignment film as $\phi1$, assuming a narrow angle out of intersection angles between the alignment axis of the second alignment film and an extension direction of the linear portions A of the first electrode as $\phi2$, assuming a narrow angle out of intersection angles between the alignment axis of the second alignment film and an extension direction of the linear portions B of the first electrode as $\phi3$, assuming a narrow angle out of intersection angles between the reference direction and an absorption axis of the second polarizer as $\phi4$, and in measuring the angles $\phi1$ to $\phi4$ within a range from $-90°$ to $+90°$ while setting a clockwise direction as a normal direction respectively, wherein the angles $\phi1$, $\phi4$ are measured from the reference direction, and the angles $\phi2$, $\phi3$ are measured from the alignment axis of the second alignment film, a sign of the angle $\phi2$ and a sign of the angle $\phi3$ are opposite to each other within one sub pixel, the angles $\phi1$ of all sub pixels have the same sign, and following formulae (1) to (5) are satisfied in all sub pixels.

$$10°\leq|\phi1|\leq80° \tag{1}$$

$$1°\leq|\phi2|\leq20° \tag{2}$$

$$1°\leq|\phi3|\leq20° \tag{3}$$

$$0°\leq|\phi2-\phi3|\leq2° \tag{4}$$

$$0°\leq|\phi1-\phi4|\leq2° \text{ or } 88°\leq|\phi1-\phi4|\leq92° \tag{5}$$

(4) According to a fourth aspect of the present invention, there is provided a liquid crystal display device including a liquid crystal display panel which comprises: a first substrate; a second substrate arranged closer to a viewer's side than the first substrate; and negative liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on the liquid-crystal-side surface thereof; and a first polarizer arranged on the surface thereof opposite to the liquid crystal, the second substrate includes: a second alignment film arranged on the liquid-crystal-side surface thereof; and a second polarizer arranged on the surface thereof opposite to the liquid crystal, the first electrode includes linear portions A and linear portions B which extend in a direction along long sides out of long sides and the short sides of each sub pixel, and assuming a first direction along an arbitrary one side of the display region as a reference direction, assuming a narrow angle out of intersection angles between the reference direction and a direction orthogonal to an alignment axis of the second alignment film as $\Phi1$, assuming a narrow angle out of intersection angles between a direction orthogonal to the alignment axis of the second alignment film and an extension direction of the linear portions A of the first electrode as $\Phi2$, assuming a narrow angle out of intersection angles between the alignment axis of the second alignment film and an extension direction of the linear portions B of the first electrode as $\Phi3$, assuming a narrow angle out of intersection angles between the reference direction and an absorption axis of the second polarizer as $\phi4$, and in measuring the angles $\Phi1$, $\Phi2$, $\Phi3$, $\phi4$ within a range from $-90°$ to $+90°$ while setting a clockwise direction as a normal direction respectively, wherein the angles $\Phi1$, $\phi4$ are measured from the reference direction, and the angles $\Phi2$, $\Phi3$ are measured from a direction orthogonal to the alignment axis of the second alignment film, a sign of the angle $\Phi2$ and a sign of the angle $\Phi3$ are opposite to each other within one sub pixel, the angles $\Phi1$ of all sub pixels have the same sign, and following formulae (1) to (5) are satisfied in all sub pixels.

$$10°\leq|\Phi1|\leq80° \tag{1}$$

$$1°\leq|\Phi2|\leq20° \tag{2}$$

$$1°\leq|\Phi3|\leq20° \tag{3}$$

$$0°\leq|\Phi2-\Phi3|\leq2° \tag{4}$$

$$0°\leq|\Phi1-\Phi4|\leq2° \text{ or } 88°\leq|\Phi1-\Phi4|\leq92° \tag{5}$$

To simply explain advantageous effects acquired by the typical inventions among the inventions described in this specification, they are as follows.

According to the liquid crystal display device of the present invention, the absorption axis of the polarizer on a viewer's side can be set to the arbitrary direction and hence, even when a viewer wears polarization glasses, it is possible to prevent a case that the viewer cannot observe an image.

DETAILED DESCRIPTION OF THE INVENTION

Hereinafter, embodiments of the present invention are explained in detail in conjunction with attached drawings.

In all drawings for explaining embodiments, parts having identical functions are given same symbols and their repeated explanation is omitted.

Embodiment 1

Figure 1:
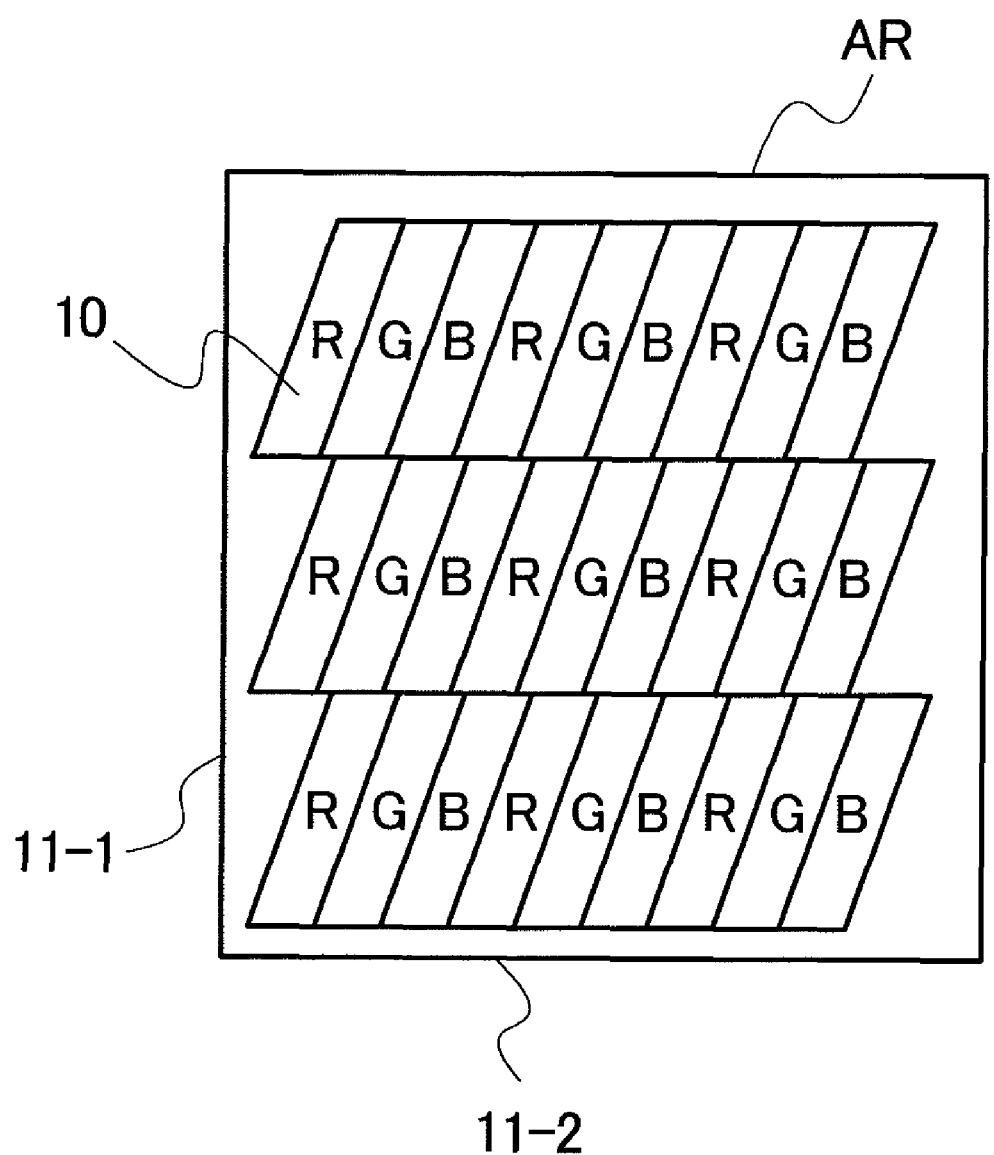
FIG. 1 is a schematic view showing the pixel arrangement of a liquid crystal display panel according to an embodiment 1 of the present invention.

FIG. 1 is a schematic view showing a pixel arrangement of a liquid crystal display panel according to an embodiment 1 of the present invention.

In the liquid crystal display panel of this embodiment, different from the related art, sub pixels 10 having a parallelogram shape are arranged within a display region (AR) in the longitudinal direction as well as in the lateral direction.

Figure 2:
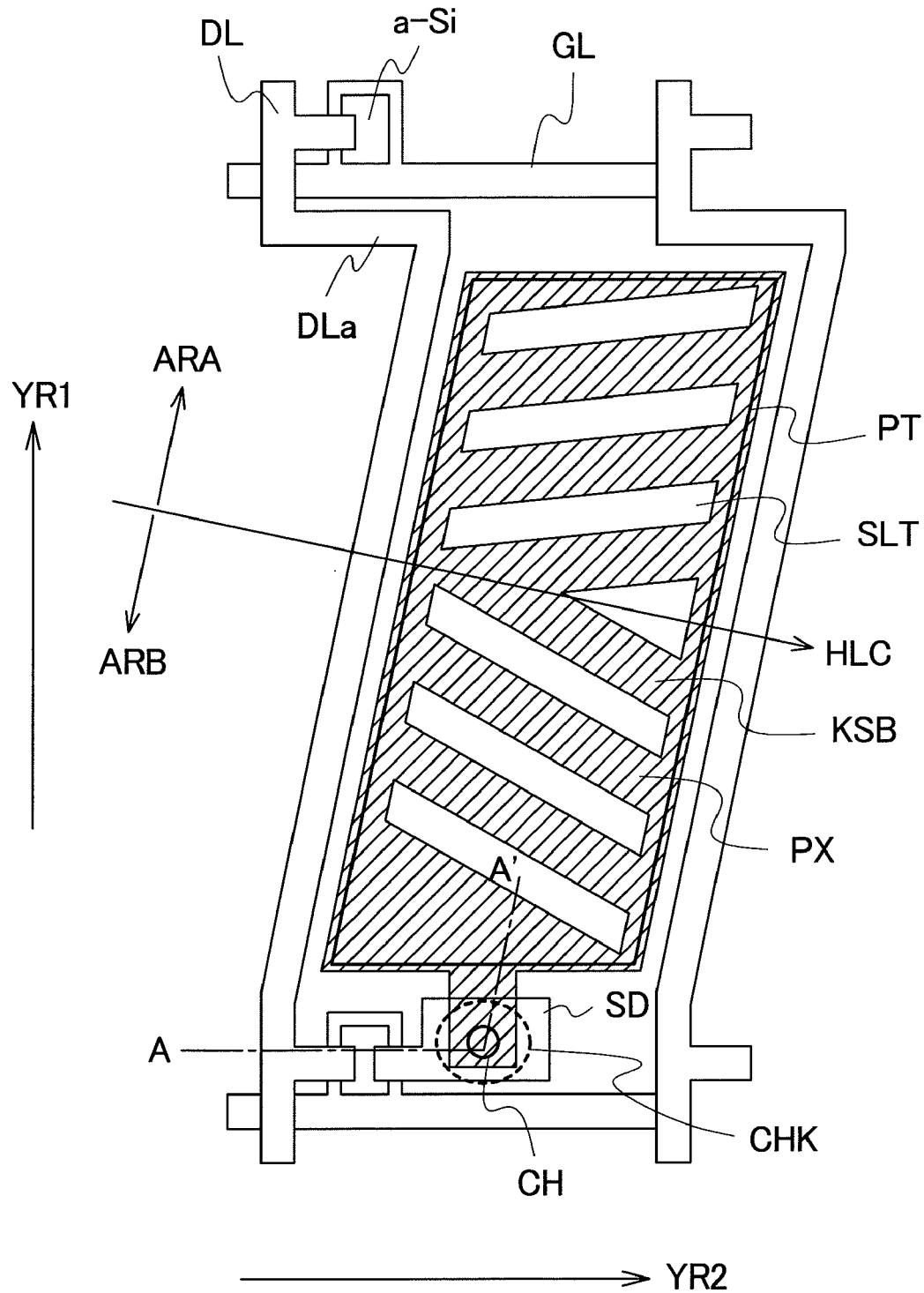
FIG. 2 is a schematic plan view for explaining the electrode structure of the liquid crystal display panel according to the embodiment 1 of the present invention.
Figure 8:
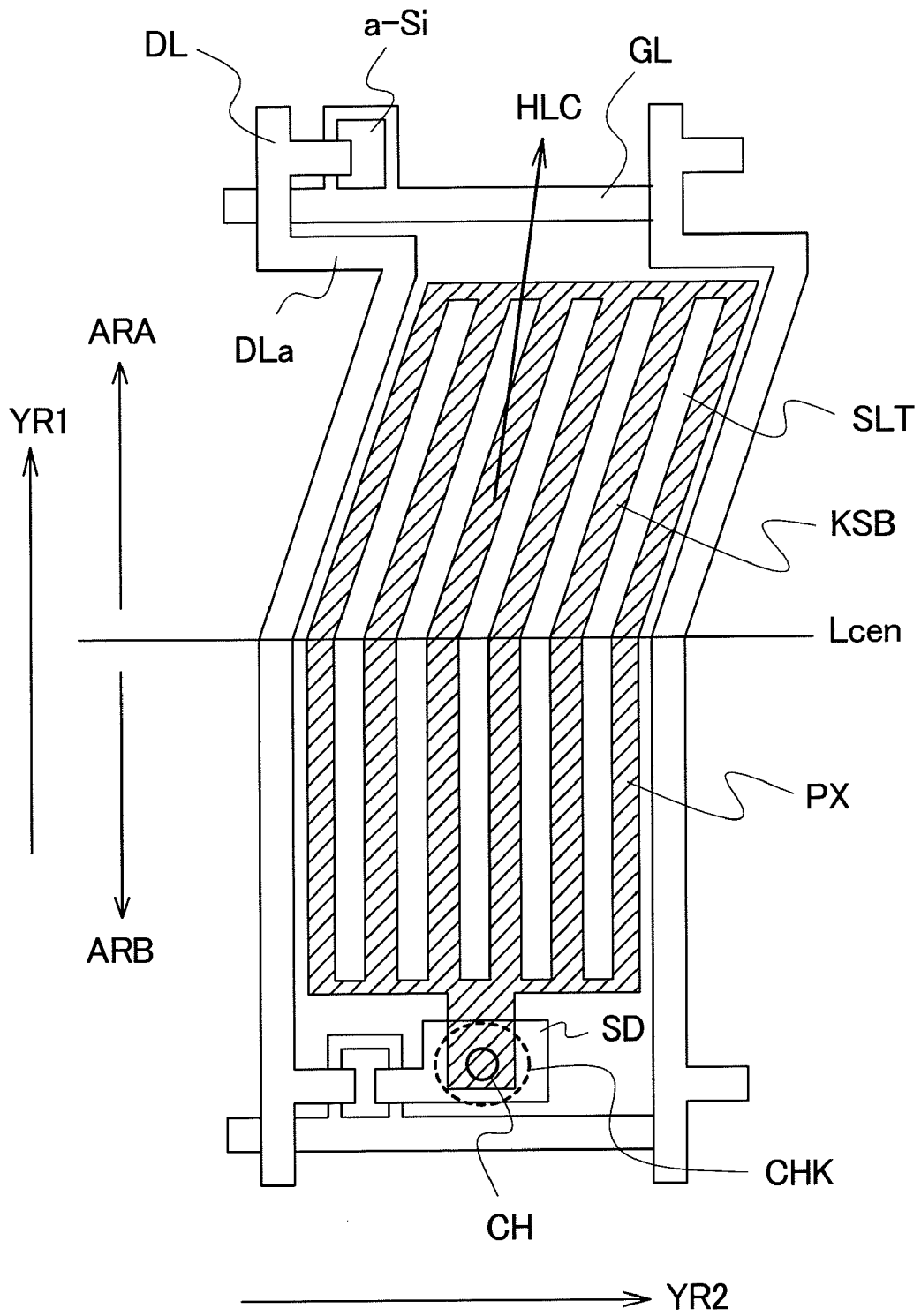
FIG. 8 is a schematic plan view for explaining the electrode structure of the liquid crystal display panel according to an embodiment 2 of the present invention.

FIG. 2 is a schematic plan view for explaining the electrode structure of the liquid crystal display panel according to the embodiment 1 of the present invention. This embodiment is directed to a case in which linear portions (KSB) of a pixel electrode (PX) extend in a direction along short sides out of long sides and the short sides of each sub pixel. In FIG. 2 and FIG. 8 explained later, symbol a-Si indicates a semiconductor layer, symbol CH indicates a contact hole for connecting a conductive layer (SD) which functions as a source electrode and the pixel electrode (PX), and symbol CHK indicates an opening portion formed in a counter electrode (CT) not shown in the drawing. Although a counter electrode is formed in a planar shape below and over the whole region of the pixel electrode (PX) such that the counter electrode also covers video lines (DL) and the like except for the opening portion (CHK), the counter electrode is omitted from FIG. 2.

Figure 11:
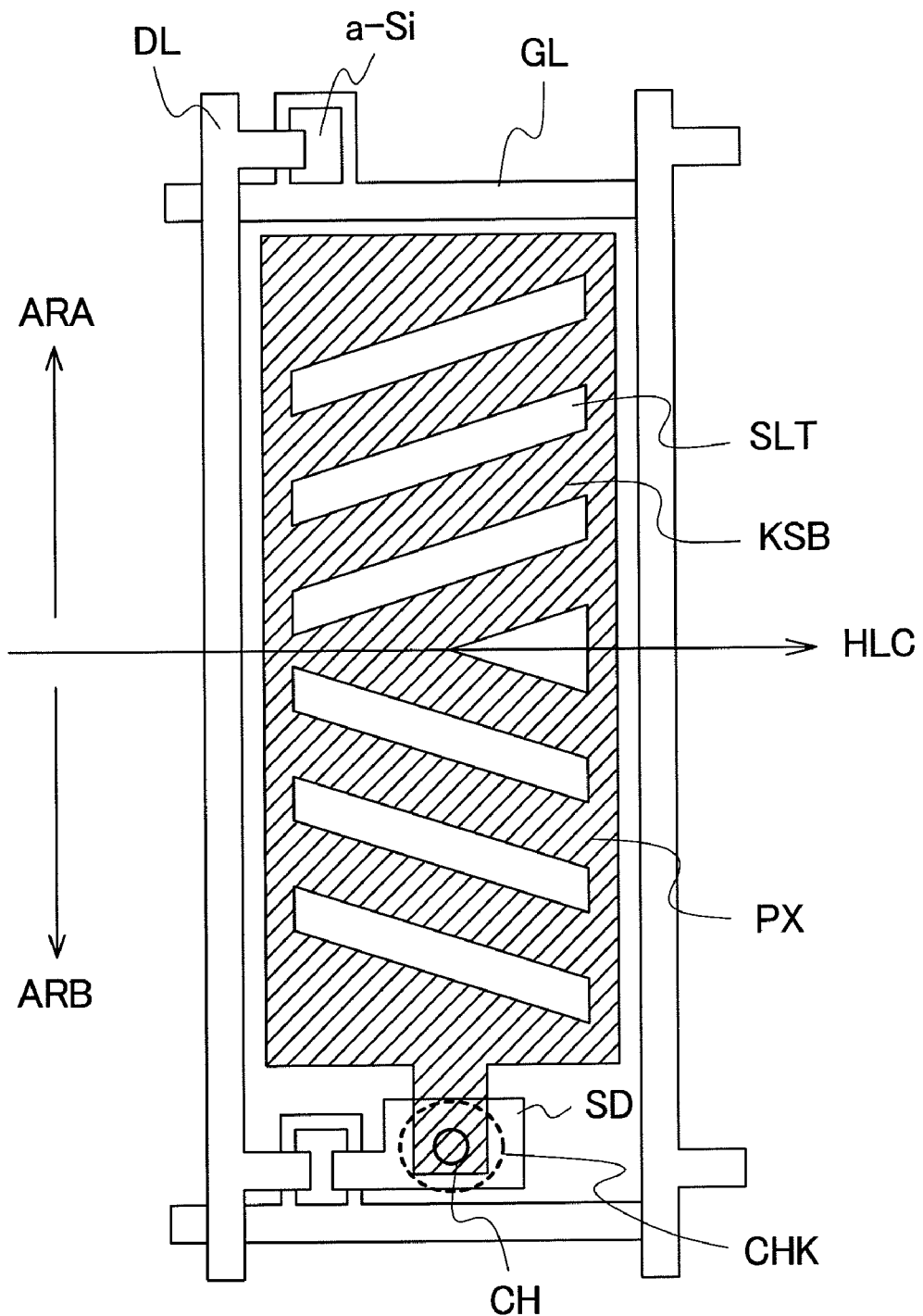
FIG. 11 is a view for explaining one example of the electrode structure of a conventional multi-domain type liquid crystal display panel adopting an IPS method.

In this embodiment, a multi-domain method is adopted as a mode of an IPS method and hence, a region of each sub pixel is divided into two regions (the region ARA and the region ARB in FIG. 2), and slits (SLT) formed in the divided region ARA and slits (SLT) formed in the divided region ARB are formed in line symmetry with respect to the initial alignment direction (indicated by symbol HLC in FIG. 2) of liquid crystal. Here, linear portions (KSB) divided by the slits (SLT) in the region ARA constitutes linear portions A of the pixel electrode (PX), while linear portions (KSB) divided by the slits (SLT) in the region ARB constitutes linear portions B of the pixel electrode (PX). Further, an initial alignment direction (HLC) and the linear portions (KSB) of the pixel electrode (PX) are, different from the structure of the related art shown in FIG. 11, inclined as a whole in conformity with the inclination of the sub pixel.

Further, in this embodiment, corresponding to the inclination of the sub pixel, video lines (DL) are also inclined. Further, to ensure linearity of the pixel arrangement, the video line (DL) has a fold-back portion (DLa), wherein the fold-back portion (DLa) and the inclined portion of the video line (DL) forms a shape of numeral "7".

Here, the video line (DL) extends in a partially inclined or bent manner, that is, in a locally bent manner. However, when the video line (DL) is viewed as a whole, as shown in FIG. 2, the video line (DL) extends in the first direction indicated by an arrow YR1 (in the direction of short sides 11-1 of a display region (AR) shown in FIG. 1). Further, scanning lines (GL) extend in the second direction indicated by an arrow YR2 in FIG. 2 (in the direction of long sides 11-2 of the display region (AR) shown in FIG. 1).

Figure 3:
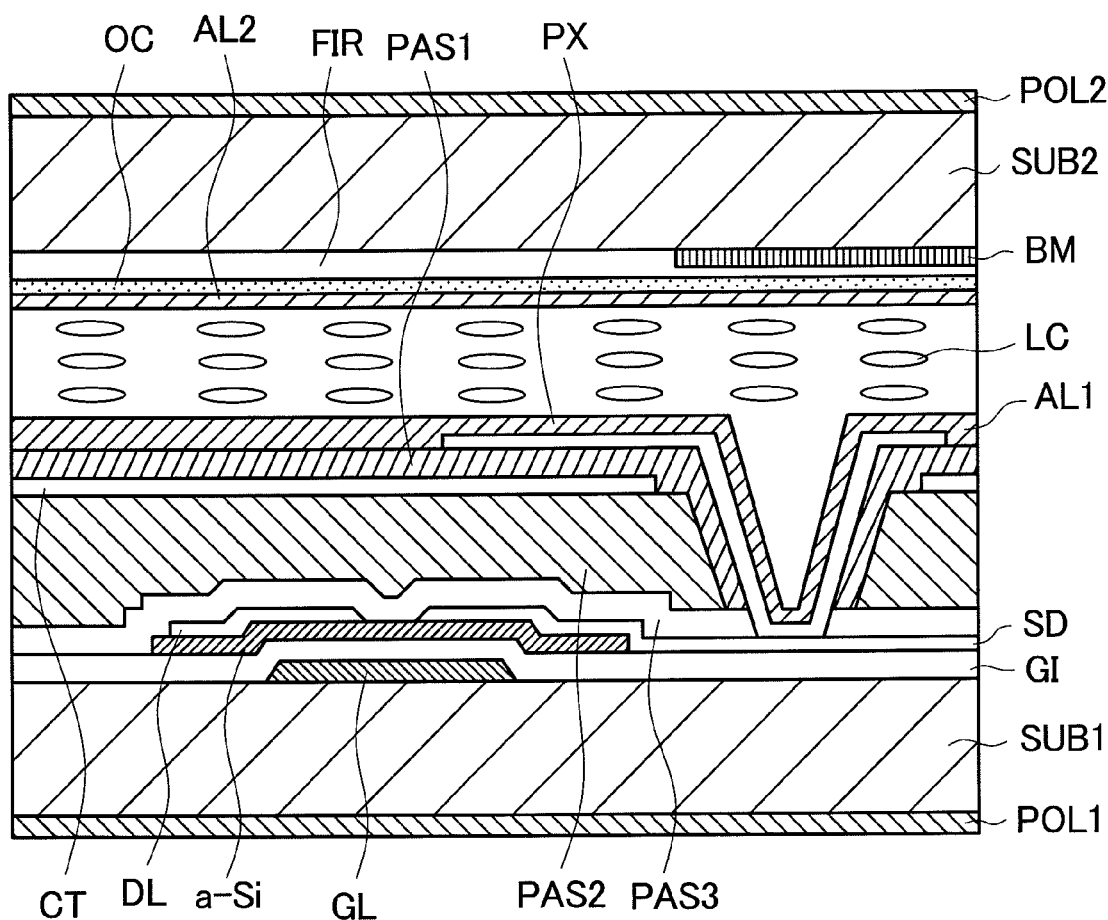
FIG. 3 is a cross-sectional view of an essential part showing the schematic cross-sectional structure of one sub pixel of a liquid crystal display device according to the embodiment 1 of the present invention.

FIG. 3 is a cross-sectional view of an essential part showing the schematic cross-sectional structure of one sub pixel of the liquid crystal display device according to the embodiment 1 of the present invention. Here, FIG. 3 is a cross-sectional view showing the cross-sectional structure taken along a line A-A in FIG. 2.

The liquid crystal display device of this embodiment includes a first substrate (SUB1; also referred to as a TFT substrate) and a second substrate (SUB2; also referred to as a counter substrate) which sandwich a liquid crystal layer (LC) made of positive liquid crystal therebetween. In the liquid crystal display device of this embodiment, a main surface side of the second substrate (SUB2) constitutes a viewing side.

As shown in FIG. 3, on a liquid-crystal-layer side of the first substrate (SUB1), in order from the first substrate (SUB1) to the liquid crystal layer (LC), the scanning lines (also referred to as gate lines) (GL), a gate insulation film (GI), the semiconductor layers (a-Si), conductive layers (SD) which function as the video lines (also referred to as the drain lines) (DL) and source electrodes, an interlayer insulation film (PAS3), an interlayer insulation film (PAS2), the counter electrodes (CT; also referred to as common electrodes), an interlayer insulation film (PAS1), the pixel electrodes (PX), and a first alignment film (AL1) are formed. Here, a first polarizer (POL1) is arranged outside the first substrate (SUB1).

Further, a thin film transistor (TFT) is constituted of a portion of the scanning line (GL) (gate electrode), the gate insulation film (GI), the semiconductor layer (a-Si), a portion of the video line (DL) (drain electrode) and the conductive layer (source electrode) (SD).

On the liquid-crystal-layer side of the second substrate (SUB2), in order from the second substrate (SUB2) to the liquid crystal layer (LC), a black matrix (light blocking film) (BM), color filters of red, green and blue (FIR), a leveling film (OC), and a second alignment film (AL2) are formed. Here, a second polarizer (POL2) is arranged outside the second substrate (SUB2).

Further, in this embodiment, the counter electrode (CT) is formed in a planar shape, and the pixel electrode (PX) is formed of an electrode having a plurality of slits (SLT) Portions divided by the slits (SLT) formed in the pixel electrode (PX) constitutes linear portions (comb-teeth electrode) (KSB). Although both ends of the slit (SLT) are closed in FIG. 2, one end of the slit (SLT) may be opened.

In general, the pixel electrodes (PX) and the counter electrodes (CT) are formed of a transparent conductive film made of ITO (Indium Tin Oxide) or the like, for example. Further, the pixel electrode (PX) and the counter electrode (CT) overlap with each other by way of the interlayer insulation film (PAS1) thus forming a holding capacitance. The interlayer insulation film (PAS1) may not be limited to the one-layered structure but may be two-or-more-layered structure.

Further, as shown in FIG. 2, one sub pixel is formed within a region having a parallelogram shape surrounded by the scanning lines (GL) and the video lines (DL). Since the region in which one sub pixel is formed is shielded from light by the black matrix (light blocking film) (BM) formed on a second substrate (SUB2) side, a region which substantially functions as a region for forming one sub pixel becomes an opening portion formed in the black matrix (BM) (indicated by a bold line in FIG. 2).

In the liquid crystal display device of this embodiment, the pixel electrode (PX) having the linear portions and the planar counter electrode (CT) are stacked to each other by way of the interlayer insulation film (PAS1), and arcuate lines of electric force which are formed between the pixel electrode (PX) and the counter electrode (CT) are distributed over the liquid crystal layer (LC) in a penetrating manner thus changing the alignment of the liquid crystal layer (LC). That is, both of the pixel electrodes (PX) and the counter electrodes (CT) are formed on the same substrate and liquid crystal is driven by generating an electric fields due to the difference in potential between the pixel electrodes (PX) and the counter electrodes (CT).

[Technical Matter which Constitutes Premise of the Present Invention]

The liquid crystal display panel of the present invention can be acquired on a premise that the following relationships are satisfied with respect to absorption axes of the polarizers, alignment axes of the alignment films and the like.

(I-1)

The absorption axis of the second polarizer (POL2) and the absorption axis of the first polarizer (POL1) intersect each other orthogonally within an error range of ±1°.

(I-2)

The alignment axis of the second alignment film (AL2) and the alignment axis of the first alignment film (AL1) are arranged parallel to each other within an error range of ±2°.

(I-3)

The Absorption Axis of the Second Polarizer (POL2) and the alignment axis of the second alignment film (AL2) are arranged parallel to each other or intersect each other orthogonally within an error range of ±2°.

(I-4)

The linear portions of the pixel electrode (PX) Extend in an inclined manner with respect to the alignment axis of the second alignment film (AL2) by a pre-twist angle, and an absolute value of the pre-twist angle is set to a value which falls within a range from 0° to 20° (desirably a value which falls within a range from 5° to 15°) in case of positive liquid crystal, and is set to a value which falls within a range from 70° to 90° (desirably a value which falls within a range from 75° to 85°) in case of negative liquid crystal. However, when a multi-domain method is adopted, the multi-domain structure cannot be obtained when the pre-twist angle is 0° and hence, the absolute value of the pre-twist angle is set to a value which falls within a range from 1° to 20° (desirably a value which falls within a range from 5° to 15°) in case of positive liquid crystal, and is set to a value which falls within a range from 70° to 89° (desirably a value which falls within a range from 75° to 85°) in case of negative liquid crystal.

Under such conditions which constitute the premise of the present invention, for setting the absorption axis of the second polarizer (POL2) to a value which falls within a range from 10° to 80° or within a range from −10° to −80° displaced from 0° and 90° by 10° or more, and desirably a value which falls within a range from 30° to 60° or within a range from −30° to −60° displaced from 30° or more, in this embodiment, a shape of the sub pixel is inclined. Here, 0° is the extension direction of the video lines (DL), 90° is the direction orthogonal to the extension direction of the video lines (DL), and the angle is an angle measured from 0° in the clockwise.

Figure 4:
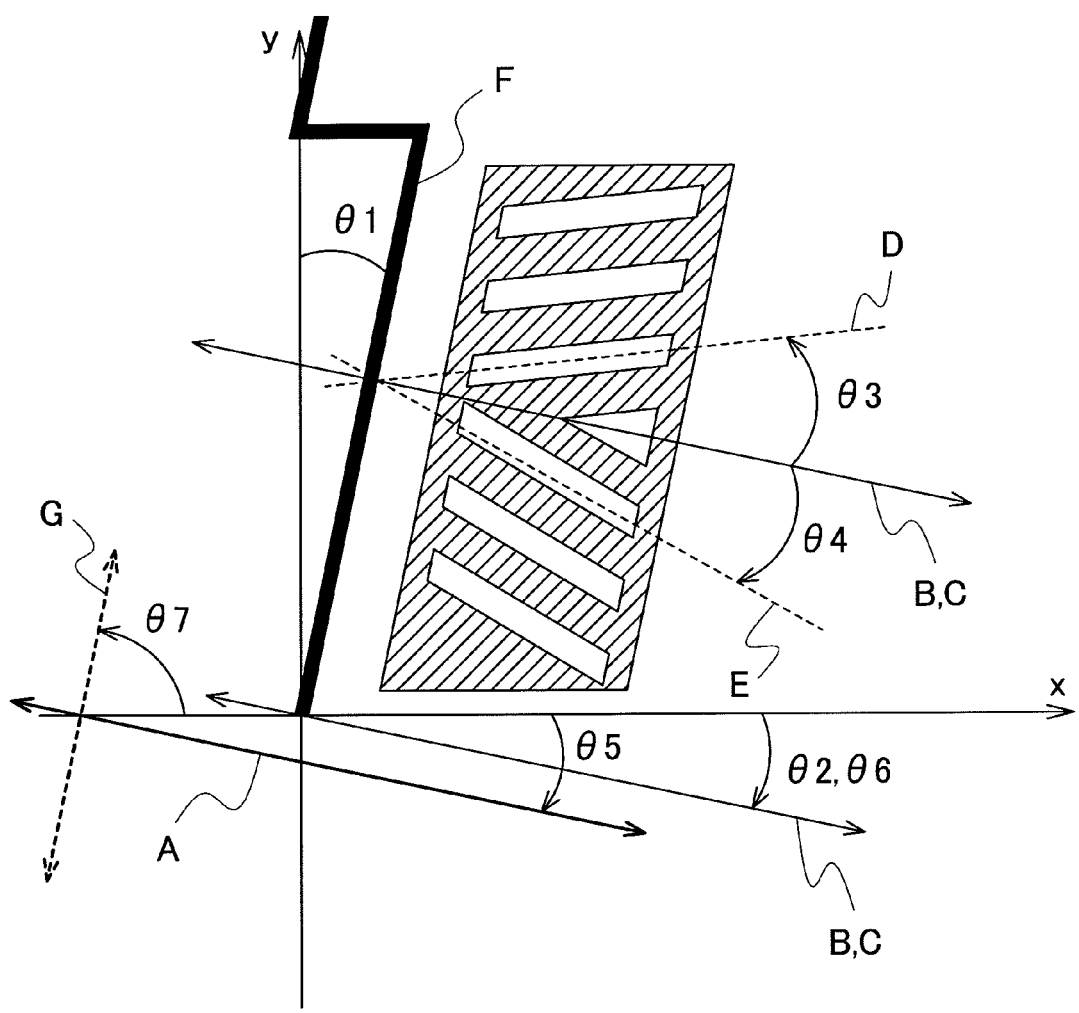
FIG. 4 is a view for explaining one example of a relationship between linear portions of a pixel electrode and alignment axes of first and second alignment films in the liquid crystal display panel according to the embodiment 1 of the present invention.

Hereinafter, a relationship between the linear portions of the pixel electrode (PX) and the alignment axes of the first and second alignment films with respect to the liquid crystal display panel of this embodiment is explained in conjunction with FIG. 4. A y-axis direction in FIG. 4 is the first direction (y) (in the direction of the short sides 11-1 of the display region (AR)), and an x-axis direction in FIG. 4 is the second direction (x) (in the direction of the long sides 11-2 of the display region (AR)).

In this embodiment, the following relationships are satisfied. Here, the specific direction such as the first direction (y), the second direction (x), the alignment axis or the like is used as the reference direction, and when an angle is measured from the reference direction, the measurement is performed within a range from −90° to +90° while setting the clockwise direction from the reference direction as the normal direction.

(II-1)

Assuming a narrow angle out of intersection angles between the second direction (x) and the absorption axis (A in FIG. 4) of the second polarizer (POL2) and is measured in the clockwise direction from the second direction (x) as θ5, |θ5| is set to a value which falls within a range from 10° to 80°, desirably a value which falls within a range from 30° to 60°.

(II-2)

Based on the above-mentioned conditions (II-1) and (I-3), assuming a narrow angle out of intersection angles between the second direction (x) and the alignment axis (B in FIG. 4) of the second alignment film (AL2) and is measured in the clockwise direction from the second direction (x) as θ2, since the alignment axis of the second alignment film (AL2) is approximately parallel to or approximately orthogonal to (however, within an error range of ±2°) the absorption axis of the second polarizer (POL2), θ21 is set to a value which falls within a range from 10° to 80°, desirably a value which falls within a range from 30° to 60° (error being ignored for the sake of convenience). In FIG. 4, the alignment axis of the second alignment film (AL2) and the absorption axis of the second polarizer (POL2) are set parallel to each other. In this embodiment, assumed is the case in which the extension direction of the linear portions of the pixel electrode (PX) extends in the direction of the short sides of the sub pixel and hence, when |θ2| becomes excessively large, the inclination of the sub pixel becomes excessively large thus deteriorating the appearance of a display or narrowing an effective display region of the sub pixel. Accordingly, it is desirable to set the angle θ2 to a value which falls within a range of $10° \leq |θ2| \leq 45°$.

Here, the state that the alignment axis of the second alignment film (AL2) is approximately parallel to the absorption axis of the second polarizer (POL2) (however, within an error range of ±2°) implies that the relationship of $10° \leq |θ2−θ5| \leq 2°$ is satisfied. The state that the alignment axis of the second alignment film (AL2) and the absorption axis of the second polarizer (POL2) are arranged orthogonal to each other (however, within an error range of ±2°) implies that the relationship of $88° \leq |θ2−θ5| \leq 92°$ is satisfied.

(II-3)

Assuming a narrow angle out of intersection angles between the alignment axis (B in FIG. 4) of the second alignment film (AL2) and the extension direction of the linear portions A of the pixel electrode PX (D in FIG. 4) as θ3, assuming a narrow angle out of intersection angles between the alignment axis (B in FIG. 4) of the second alignment film (AL2) and the extension direction of the linear portions B of the pixel electrode PX (E in FIG. 4) as θ4, and measuring these angles from the alignment axis of the second alignment film (AL2) in the clockwise direction, the angles θ3 and θ4 become angles which satisfy the pre-twist angle which is the condition set in (I-4). Accordingly, when positive liquid crystal is used, the angle θ3 becomes a value which satisfies the relationship of 1°≦|θ3|≦20° and the angle θ4 becomes a value which satisfies the relationship of 1°≦|θ4|≦20°. Further, within one sub pixel, a sign (positive or negative) of the angle θ3 and a sign (positive or negative) of the angle θ4 are opposite to each other, and have the same absolute value within an error range of ±2°. That is, the relationship of 0°≦|θ3−θ4|≦2° is established. In FIG. 4, the angle θ3 takes a negative value due to the counterclockwise rotation and the angle θ4 takes a positive value due to the clockwise rotation. (II-4)

In this embodiment, assumed is the case in which the linear portions of the pixel electrode (PX) extend in the direction of the short sides of the sub pixel. Accordingly, the video line (DL) is locally inclined such that the extension direction (F in FIG. 4) of the portion of the video line (DL) becomes orthogonal to the alignment axis (B in FIG. 4) of the second alignment film (AL2) (within an error range of ±2°). That is, assuming a narrow angle out of intersection angles between the first direction (y) and the extension direction (F in FIG. 4) of a portion of the video line (DL) and is measured in the clockwise direction from the first direction (y) as θ1, θ1 is set to a value which satisfies a relationship of 0°≦|θ1−θ2|≦2°. (II-5)

Based on the condition set in (II-4), a sign of the angle θ1 and a sign of the angle θ2 become the same sign (positive sign in the case shown FIG. 4) within one sub pixel. Further, to establish the above-mentioned constitution in all sub pixels, the angles θ1 of all sub pixels have the same sign.

Accordingly, with respect to the structure of the sub pixel, as described previously, the sub pixel is inclined to form a parallelogram, and all sub pixels are inclined in the same direction (that is, all sub pixels being inclined toward a right side or a left side).

Further, assuming a narrow angle out of intersection angles between the second direction (x) and the alignment axis (C in FIG. 4) of the first alignment film (AL1) and is measured in the clockwise direction from the second direction (x) as θ6, and assuming a narrow angle out of intersection angles between the second direction (x) and the absorption axis (G in FIG. 4) of the first polarizer (POL1) and is measured in the clockwise direction from the second direction (x) as θ7, based on the conditions set in (I-1) and (I-2), a relationship of 0°≦|θ2−θ6|≦2° and a relationship of 89°≦|θ5−θ7|≦91° are satisfied. In the case shown in FIG. 4, the angle θ5 takes a positive value and hence, the angle θ7 takes a negative value.

Here, when the alignment axis of the second alignment film (AL2) is arranged approximately orthogonal to the absorption axis of the second polarizer (POL2) (within an error range of ±2°), in FIG. 4, it is sufficient to exchange A and G and the above-mentioned relationships are directly established. In this case, the angle θ5 takes a negative value and the angle θ7 takes a positive value.

Figure 5:
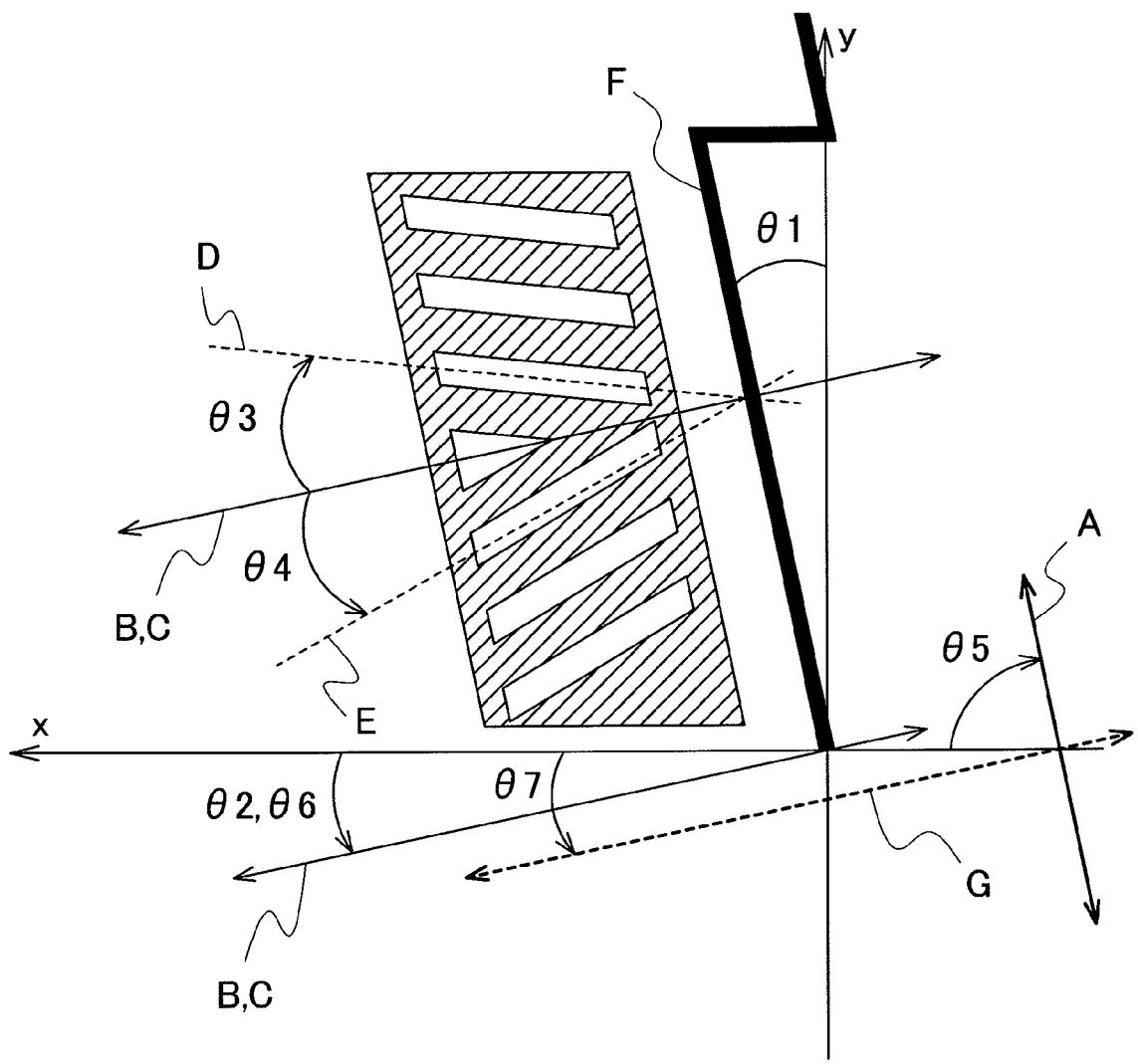
FIG. 5 is a view for explaining another example of a relationship between linear portions of a pixel electrode and alignment axes of first and second alignment films in the liquid crystal display panel according to the embodiment 1 of the present invention.

As shown in FIG. 5, the inclination direction of the pixel may be set opposite to the inclination direction of the pixel shown in FIG. 4. It is defined that the angle takes a negative value when the angle is measured in the counterclockwise direction from the reference direction and hence, also in this case, the sign of the angle θ1 and the sign of the angle θ2 have the same sign (negative) and, at the same time, the above-mentioned relationships with respect to the angles θ1 to θ7 are established. Further, FIG. 5 illustrates the case in which the alignment axis (B in FIG. 5) of the second alignment film (AL2) is arranged approximately orthogonal to the absorption axis (A in FIG. 5) of the second polarizer (POL2) (within an error range of ±2°). It is needless to say that when the alignment axis (B in FIG. 5) of the second alignment film (AL2) is arranged approximately parallel to the absorption axis (A in FIG. 5) of the second polarizer (POL2) (within an error range of ±2°), it is sufficient to exchange A and G.

Accordingly, by assuming the clockwise direction as the positive direction based on the first direction (y), the second direction (x) and the alignment axis of the second alignment film (AL2) and by measuring the angles θ1 to θ7 within a range from −90° to +90°, the angles θ1 to θ7 can be generalized into following formulae (1).

(1) 0°≦|θ1−θ2|≦2°

(2) 10°≦|θ2|≦80° (desirably 10°≦|θ2|≦45°)

(3) 1°≦|θ3|≦20°

(4) 1°≦|θ4|≦20°

(5) 0°≦|θ3−θ4|≦2°

(6) 0°≦|θ2−θ5|≦2° or 88°≦|θ2−θ5|≦92°

(7) 0°≦|θ2−θ6|≦2°

(8) 89°≦|θ5−θ7|≦91°    (1)

Further, the sign of the angle θ1 and the sign of the angle θ2 become the same sign within one sub pixel, and the sign of the angle θ3 and the sign of the angle θ4 are opposite to each other within one sub pixel. Further, the angles θ1 of all sub pixels have the same sign.

[Modification 1 of Embodiment 1]

When the liquid crystal layer (LC) adopts negative liquid crystal, formulae equal to the above-mentioned formulae (1) are established by changing the definition of the angle θ2.

Figure 6:
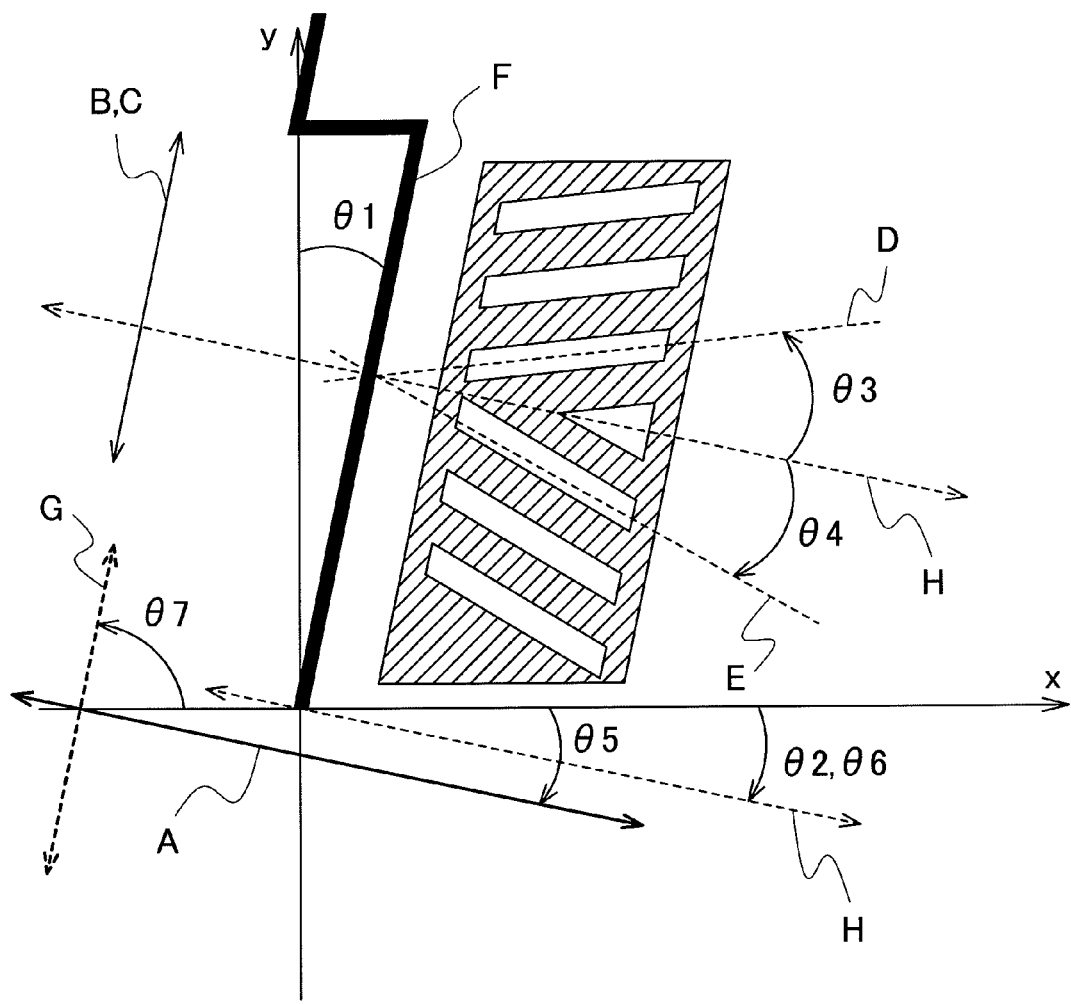
FIG. 6 is a view for explaining an angle from a first direction to a direction orthogonal to the alignment axis of the second alignment film when a liquid crystal layer is made of negative liquid crystal in the liquid crystal display panel of the embodiment 1 of the present invention.

That is, while a long-axis direction of the liquid crystal molecules is rotated in the direction toward an electric field in positive liquid crystal, the long-axis direction of the liquid crystal molecules is rotated in the direction away from an electric field in negative liquid crystal. Accordingly, in place of the above-mentioned angle θ2, as shown in FIG. 6, an angle θ2 which is a narrow angle out of intersection angles between the second direction (x) and a direction (H in FIG. 6) orthogonal to the alignment axis (B in FIG. 4) of the second alignment film (AL2) and is measured in the clockwise direction is used. Further, in place of the above-mentioned angle θ3, an angle Θ3 which is a narrow angle out of intersection angles between the direction (H in FIG. 6) orthogonal to the alignment axis of the second alignment film (AL2) and an extension direction (D in FIG. 6) of the linear portions A of the pixel electrode (PX) may be used. Still further, in place of the above-mentioned angle θ4, an angle Θ4 which is a narrow angle out of intersection angles between the direction (H in FIG. 6) orthogonal to the alignment axis of the second alignment film (AL2) and an extension direction (E in FIG. 6) of the linear portions B of the pixel electrode (PX) may be used. Here, the angle Θ3 and the angle Θ4 are measured in the clockwise direction from the direction orthogonal to the alignment axis of the second alignment film (AL2).

In the same manner, in place of the above-mentioned angle θ6, as shown in FIG. 6, an angle Θ6 which is a narrow angle out of intersection angles between the second direction (x) and the direction (H in FIG. 6) orthogonal to the alignment axis (C in FIG. 6) of the first alignment film (AL1) and is measured in the clockwise direction from the second direction (y) is used.

The angles Θ2, Θ3, Θ4 and Θ6 are also measured within a range from −90° to +90°.

Accordingly, the above-mentioned formulae (1) are expressed by the following formulae (2).

(1) $0° \leq |\theta1 - \Theta2| \leq 2°$ (2) $10° \leq |\Theta2| \leq 80°$ (desirably $10° \leq |\Theta2| \leq 45°$)

(3) $1° \leq |\Theta3| \leq 20°$ (4) $1° \leq |\Theta4| \leq 20°$ (5) $0° \leq |\Theta3 - \Theta4| \leq 2°$ (6) $0° \leq |\Theta2 - \Theta5| \leq 2°$ or $88° \leq |\Theta2 - \Theta5| \leq 92°$ (7) $0° \leq |\Theta2 - \Theta6| \leq 2°$ (8) $89° \leq |\theta5 - \theta7| \leq 91°$ (2)

Further, the sign of the angle θ1 and the sign of the angle Θ2 become the same sign within one sub pixel, and the sign of the angle Θ3 and the sign of the angle Θ4 are opposite to each other within one sub pixel. Further, the angles θ1 of all sub pixels have the same sign.

[Modification 2 of Embodiment 1]

Figure 7:
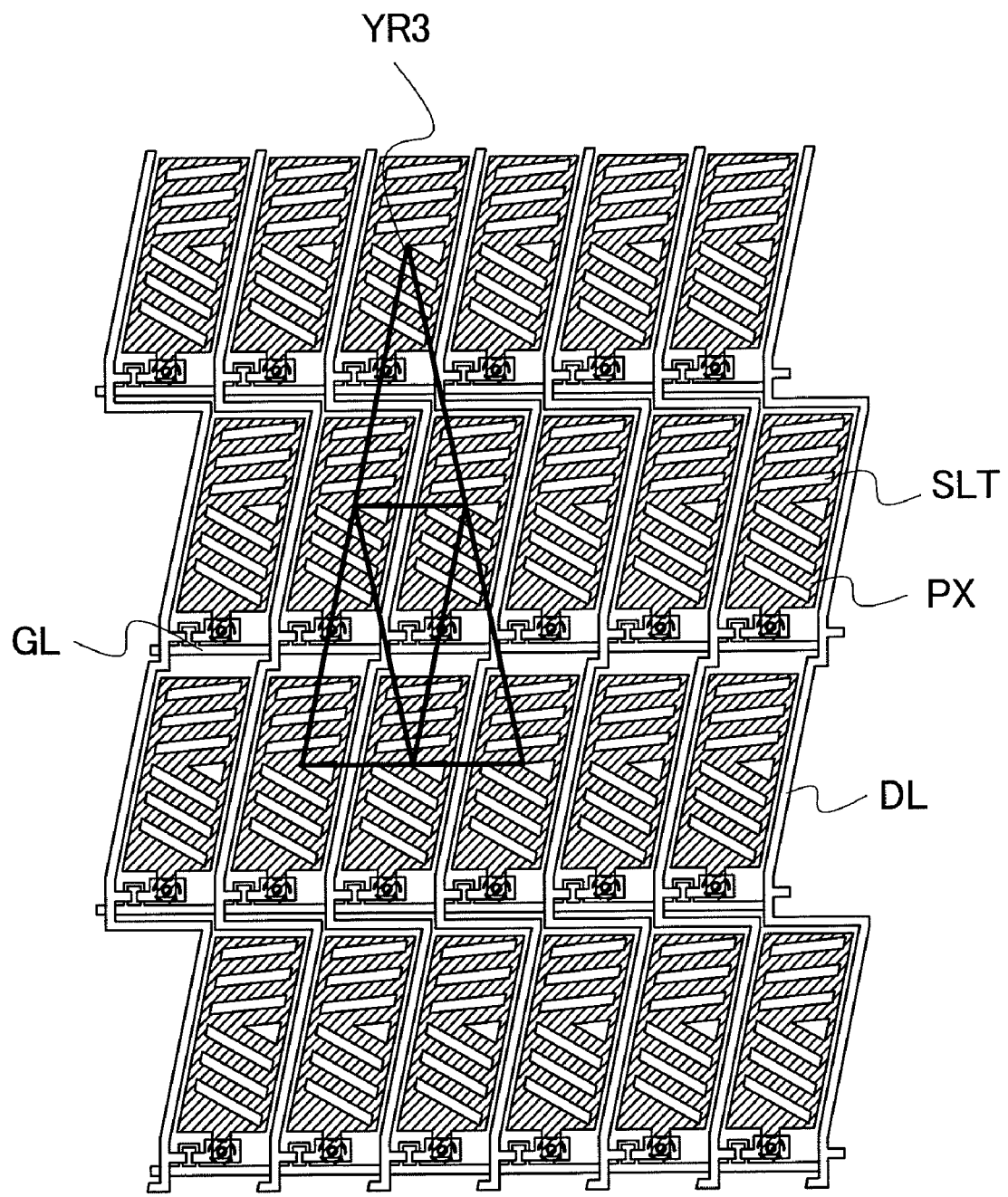
FIG. 7 is a schematic view showing a pixel arrangement of a liquid crystal display panel according to a modification 2 of the embodiment 1 of the present invention.

FIG. 7 is a schematic view showing the pixel arrangement of a liquid crystal display panel according to a modification 2 of the embodiment 1. In the liquid crystal display panel shown in FIG. 7, sub pixels are arranged in accordance with the delta arrangement. As indicated by an arrow YR3 in FIG. 7, positions of centers of gravity of the sub pixels are arranged in accordance with the delta arrangement. In this delta arrangement, when the angle |θ1| is increased, a region where the same color continuously appears obliquely is formed. Accordingly, it is desirable to set the angle |θ1| to satisfy the relationship of $|\theta1| \leq 15°$.

Embodiment 2

FIG. 8 is a schematic plan view for explaining the electrode structure of a liquid crystal display panel according to an embodiment 2 of the present invention. In this embodiment, linear portions (KSB) of a pixel electrode (PX) extend in the direction along long sides out of long sides and short sides of the sub pixel.

Figure 12:
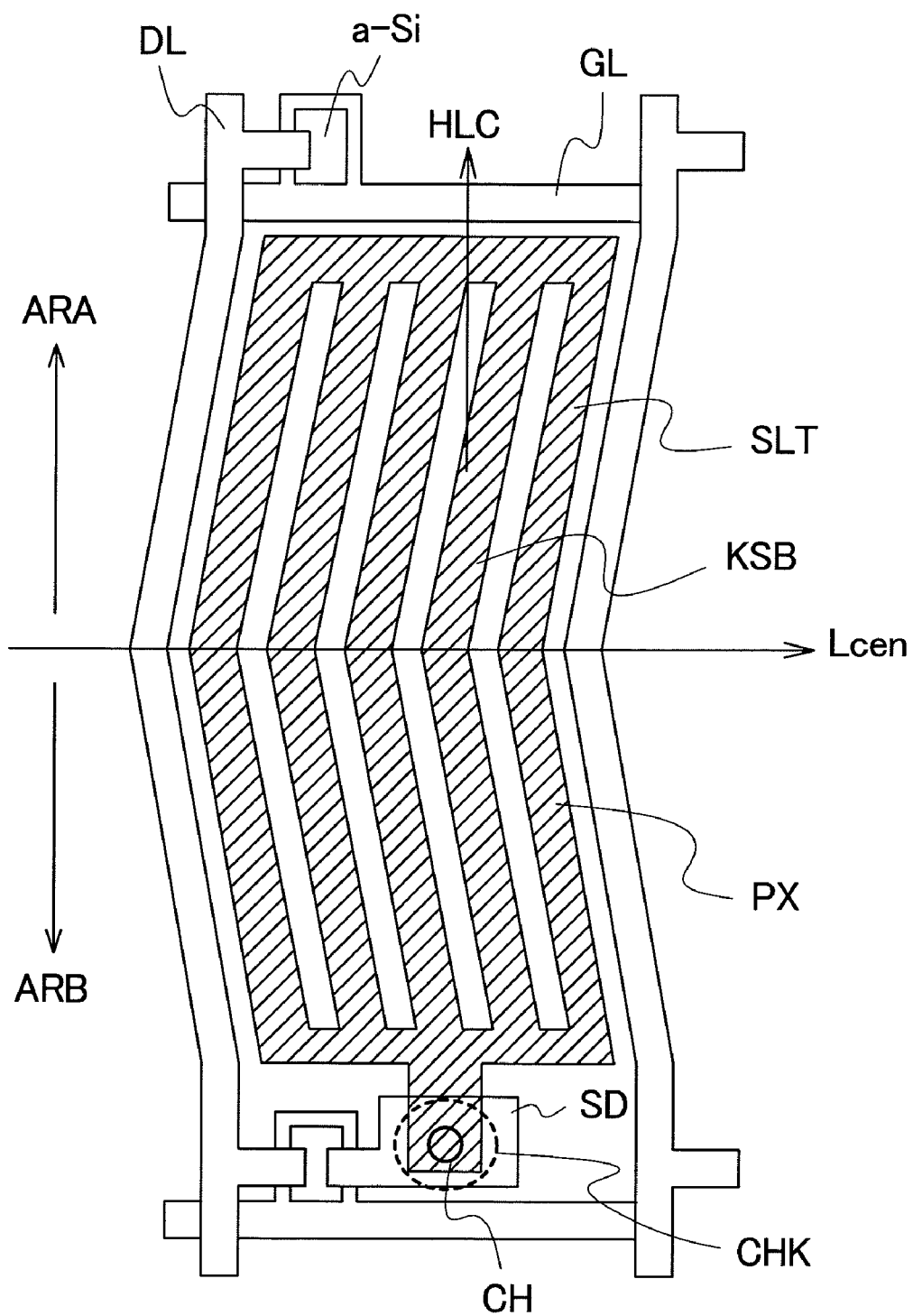
FIG. 12 is a plan view for explaining another example of the electrode structure of the conventional multi-domain type liquid crystal display panel adopting an IPS method.

In this embodiment, a region of each sub pixel is divided into two regions (the region ARA and the region ARB in FIG. 8), and the slits (SLT) differ between the divided region ARA and the divided region ARB in an inclination angle with respect to a center line Lcen, while the slits (SLT) are arranged to face each other with the center line Lcen sandwiched therebetween. Here, linear portions (KSB) divided by the slits (SLT) in the region ARA constitutes linear portions A of the pixel electrode (PX), while linear portions KSB divided by the slits (SLT) in the region ARB constitutes linear portions B of the pixel electrode (PX). Further, an initial alignment direction (HLC) and the linear portions (KSB) of the pixel electrode (PX) are, different from the structure of the related art shown in FIG. 12, inclined as a whole in conformity with the inclination of the sub pixel. Although both ends of the slit (SLT) is closed in FIG. 8, one end of the slit (SLT) may be opened.

Further, also in this embodiment, to ensure the linearity of the pixel arrangement, the video line (DL) has a fold-back portion (DLa), wherein the fold-back portion (DLa) and the inclined portion of the video line (DL) forms a shape of numeral "7".

Further, the video line (DL) differs in the inclination angle with respect to the center line Lcen between the portion A corresponding to the region (ARA) and the portion B corresponding to the region (ARB), while the portion A corresponding to the region (ARA) and the portion B corresponding to the region (ARB) are arranged to face each other with the center line Lcen sandwiched therebetween.

Here, the video line (DL) extends in a partially inclined or bent manner, that is, in a locally bent manner. However, when the video line (DL) is viewed as a whole, the video line (DL) extends in the first direction indicated by an arrow YR1 in FIG. 8 (a direction along short sides 11-1 of a display region (AR) shown in FIG. 1). Further, scanning lines (GL) extend in the second direction indicated by an arrow YR2 in FIG. 2 (a direction along long sides 11-2 of the display region (AR) shown in FIG. 1).

Figure 9:
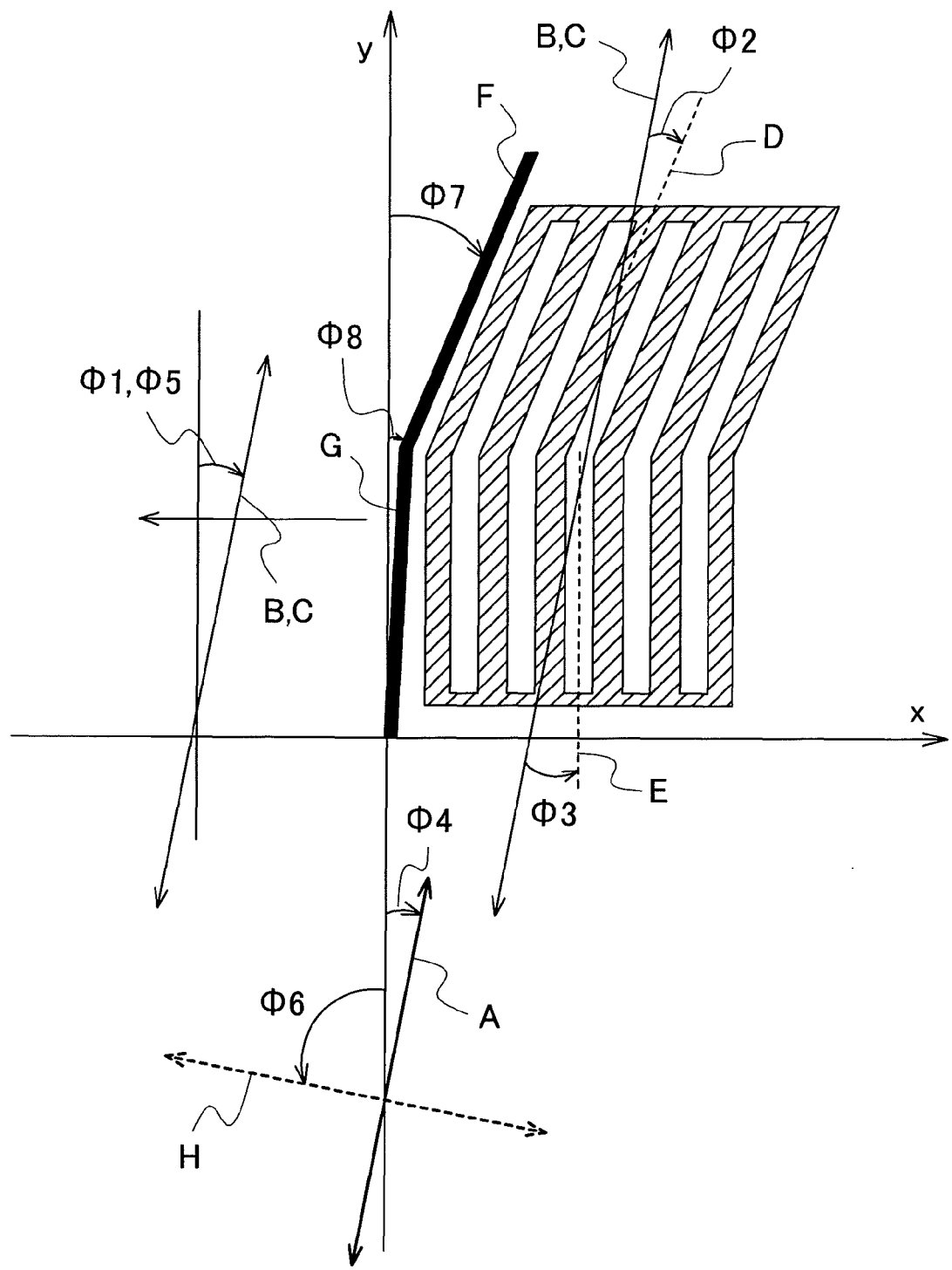
FIG. 9 is a view showing one example of a relationship among an absorption axis of a second polarizer, an alignment axis of a second alignment film, an extension direction of linear portions of a pixel electrode, an alignment axis of a second alignment film, and an absorption axis of a first polarizer in the liquid crystal display panel according to the embodiment 2 of the present invention.

FIG. 9 is a view showing one example of a relationship among an absorption axis of a second polarizer (POL2), an alignment axis of a second alignment film (AL2), an extension direction of linear portions of the pixel electrode (PX), an alignment axis of a second alignment film (AL2), and an absorption axis of a first polarizer (POL1) in the liquid crystal display panel of this embodiment.

In this embodiment, the following relationships are satisfied. Here, the specific direction such as the first direction (y), the second direction (x), the alignment axis or the like is used as the reference direction, and when an angle is measured from the reference direction, the measurement is performed within a range from −90° to +90° while setting the clockwise direction from the reference direction as the normal direction.

(III-1)

Assuming an angle which is a narrow angle out of intersection angles between the first direction (y) and the absorption axis (A in FIG. 9) of the second polarizer (POL2) and is measured in the clockwise direction from the first direction (y) as φ4, |φ4| is set to a value which falls within a range from 10° to 80°, desirably a value which falls within a range from 30° to 60°.

(III-2)

Based on the above-mentioned conditions (III-1) and (I-3), assuming an angle which is a narrow angle out of intersection angles between the first direction (y) and the alignment axis (B in FIG. 9) of the second alignment film (AL2) and is measured in the clockwise direction from the first direction (y) as φ1, since the alignment axis of the second alignment film (AL2) is approximately parallel to or approximately orthogonal to (however, within an error range of +2°) the absorption axis of the second polarizer (POL2), |φ1| is set to a value which falls within a range from 10° to 80°, desirably a value which falls within a range from 30° to 60° (error being ignored for the sake of convenience). In FIG. 9, the alignment axis of the second alignment film (AL2) and the absorption axis of the second polarizer (POL2) are set parallel to each other. In this embodiment, assumed is the case in which the extension direction of the linear portions of the pixel electrode (PX) extends in the direction along the long sides of the sub pixel and hence, when |φ1| becomes excessively large, the inclination of the sub pixel becomes excessively large thus deteriorating the appearance of a display or narrowing an effective display region of the sub pixel. Accordingly, it is more desirable to set the angle φ1 to a value which falls within a range of $10° \leq |\phi1| \leq 45°$.

Here, the state that the alignment axis of the second alignment film (AL2) is approximately parallel to the absorption axis of the second polarizer (POL2) (however, within an error range of ±2°) implies that the relationship of 0°≦|φ1−φ4|≦2° is satisfied. The state that the alignment axis of the second alignment film (AL2) and the absorption axis of the second polarizer (POL2) are arranged orthogonal to each other (however, within an error range of ±2°) implies that the relationship of 88°≦|φ1−φ4|≦92° is satisfied.

(III-3)

Assuming a narrow angle out of intersection angles between the alignment axis (B in FIG. 9) of the second alignment film (AL2) and the extension direction of the linear portions A of the pixel electrode (PX) (D in FIG. 8) as φ2, assuming a narrow angle out of intersection angles between the alignment axis (B in FIG. 4) of the second alignment film (AL2) and the extension direction of the linear portions B of the pixel electrode (PX) (E in FIG. 4) as φ3, and measuring these angles from the alignment axis of the second alignment film (AL2) in the clockwise direction, the angles φ2 and φ3 become angles which satisfy the pre-twist angle which is the condition set in (I-4). Accordingly, when positive liquid crystal is used, the angle φ2 becomes a value which satisfies the relationship of 1°≦|φ2|≦20° and the angle φ3 becomes a value which satisfies the relationship of 1°≦|φ3|≦20°. Further, a sign (positive or negative) of the angle φ2 and a sign (positive or negative) of the angle φ3 are opposite from each other, and have the same absolute value within an error range of ±2° within one sub pixel. That is, the relationship of 0°≦|φ2−φ3|≦2° is established. In FIG. 9, the angle φ2 takes a positive value due to the clockwise rotation and the angle φ3 takes a negative value due to the counterclockwise rotation.

(III-4)

In this embodiment, assumed is the case in which the extension direction of the linear portions of the pixel electrode (PX) extends in the direction along the long sides of the sub pixel and hence, assuming an angle which is a narrow angle out of intersection angles between an extension direction of a portion A of the video line (DL) corresponding to a region (ARA) (F in FIG. 9) and the first direction (y) and is measured in the clockwise direction from the first direction (y) as φ7, |φ7| is desirably set to a value which falls within a range from 10° to 65°. Further, the extension direction D shown in FIG. 9 and the extension direction F shown in FIG. 9 are arranged parallel to each other within an error range of ±2°. That is, the relationship of 0°≦|(φ1+φ2)−φ7|≦2° is established.

In the same manner, with respect to a region (ARB) which sandwiches a center line Lcen with the region (ARA), assuming an angle which is a narrow angle out of intersection angles between an extension direction of a portion B of the video line (DL) corresponding to the region (ARB) (G in FIG. 8) and the first direction (y) and is measured in the clockwise direction from the first direction (y) as φ8, |φ8| is desirably set to a value which falls within a range from 0° to 2°. Further, the extension direction E shown in FIG. 9 and the extension direction G shown in FIG. 9 are arranged parallel to each other within an error range of ±2°. That is, the relationship of 0°≦|(φ1+φ3)−φ8|≦2° is established.

Further, a sign of the angle φ1, a sign of the angle φ7 and a sign of the angle φ8 are all equal within one sub pixel, or the sign of the angle φ1 and the sign of the angle φ7 are equal and the angle φ8 is 0° in one sub pixel.

(III-5)

Further, to establish the above-mentioned constitution in all sub pixels, the angles φ1 of all sub pixels have the same sign.

Accordingly, with respect to the structure of the sub pixel, as described previously, the sub pixel is inclined to form a parallelogram, and all sub pixels are inclined in the same direction (that is, all sub pixels being inclined toward a right side or a left side).

Further, assuming an angle which is a narrow angle out of intersection angles between the first direction (y) and the alignment axis (C in FIG. 9) of the first alignment film (AL1) and is measured in the clockwise direction from the first direction (y) as φ5, and assuming an angle which is a narrow angle out of intersection angles between the first direction (y) and the absorption axis (H in FIG. 4) of the first polarizer (POL1) and is measured in the clockwise direction from the first direction (y) as φ6, based on the conditions set in (I-1) and (I-2), a relationship of 0°≦|φ1−φ5|≦2° and a relationship of 89°≦|φ4−φ6|≦91° are satisfied. In FIG. 9, the angle φ4 takes a positive value and hence, the angle φ6 takes a negative value.

Here, when the alignment axis of the second alignment film (AL2) is arranged approximately orthogonal to the absorption axis of the second polarizer (POL2) (within an error range of ±2°), in FIG. 9, it is sufficient to exchange A and H and the above-mentioned relationships are directly established. In this case, the angle φ4 takes a negative value and the angle φ6 takes a positive value.

Although not shown in the drawing, the inclination direction of the pixel may be set opposite to the inclination direction of the pixel shown in FIG. 9.

Accordingly, by setting the clockwise direction as the positive direction based on the first direction (y) and the alignment axis of the second alignment film (AL2) and by measuring the angles φ1 to φ8 within a range from −90° to +90°, the angles φ1 to φ8 can be generalized into following formula (3).

(1) 10°≦|φ1|≦80° (desirably 10°≦|φ1|≦45°)

(2) 1°≦|φ2|≦20°

(3) 1°≦|φ3|≦20°

(4) 0°≦|φ2−φ3|≦2°

(5) 0°≦|φ1−φ4|≦2° or 88°≦|φ1−φ4|≦92°

(6) 0°≦|φ1−φ5|≦2°

(7) 89°≦|φ4−φ6|≦91°

(8) 0°≦|(φ1+φ2)−φ7|≦2°

(9) 0°≦|(φ1+φ3)−φ8|≦2°

(10) 10°≦|φ7|≦65°

(11) 0°≦|φ8|≦2°          (3)

Further, the sign of the angle φ2 and the sign of the angle φ3 are opposite to each other within one sub pixel. Further, the angles φ1 of all sub pixels have the same sign.

Further, a sign of the angle φ1, a sign of the angle φ7 and a sign of the angle φ8 are equal within one sub pixel, or the sign of the angle φ1 and the sign of the angle φ7 are equal and the angle φ8 is 0° in one sub pixel.

[Modification 1 of Embodiment 2]

When the liquid crystal layer (LC) is made of negative liquid crystal, in place of the above-mentioned angle φ1, an angle Φ1 which is a narrow angle out of intersection angles between the first direction (y) and a direction orthogonal to the alignment axis of the second alignment film (AL2) may be used. In place of the above-mentioned angle φ2, an angle Φ2 which is a narrow angle out of intersection angles between the direction orthogonal to the alignment axis of the second alignment film (AL2) and an extension direction of the linear portions A of the pixel electrode (PX) may be used. In place of the above-mentioned angle ϕ3, an angle Φ3 which is a narrow angle out of intersection angles between the direction orthogonal to the alignment axis of the second alignment film (AL2) and an extension direction of the linear portions B of the pixel electrode (PX) may be used. Here, the angle Φ1 is measured in the clockwise direction from the first direction (y), and the angle Φ2 and the angle Φ3 are measured in the clockwise direction from the direction orthogonal to the alignment axis of the second alignment film (AL2) respectively.

In the same manner, in place of the above-mentioned angle ϕ5, an angle Φ5 which is a narrow angle out of intersection angles between the first direction (y) and a direction orthogonal to the alignment axis of the first alignment film (AL1) may be used.

The angles Φ1, Φ2, Φ3 and Φ5 may be also measured within a range from −90° to +90°.

Accordingly, the above-mentioned formulae (3) are expressed by the following formulae (4).

(1) $10° \leq |\Phi 1| \leq 80°$ (desirably $10 \leq |\phi 1| \leq 45°$)

(2) $1° \leq |\Phi 2| \leq 20°$ (3) $1° \leq |\Phi 3| \leq 20°$ (4) $0° \leq |\Phi 2 - \Phi 3| \leq 2°$ (5) $0° \leq |\Phi 1 - \Phi 4| \leq 2°$ or $88° \leq |\phi 1 - \phi 4| \leq 92°$ (6) $0° \leq |\Phi 1 - \Phi 5| \leq 2°$ (7) $89° \leq |\phi 4 - \phi 6| \leq 91°$ (8) $0° \leq |(\Phi 1 + \Phi 2) - \Phi 7| \leq 2°$ (9) $0° \leq |(\Phi 1 + \Phi 3) - \Phi 8| \leq 2°$

(10) $10° \leq |\phi 7| \leq 65°$

(11) $0° \leq |\phi 8| \leq 2°$ (4)

Within one sub pixel, a sign of the angle Φ2 and a sign of the angle Φ3 are opposite to each other. Further, the angles Φ1 of all sub pixels have the same sign.

Within one sub pixel, all of a sign of angle Φ1, a sign of angle ϕ7 and a sign of angle ϕ8 are equal. Further, within one sub pixel, the sign of the angle Φ1 and the sign of the angle ϕ7 are equal to each other, and the angle ϕ8 assumes 0°.

[Modification 2 of Embodiment 2]

Figure 10:
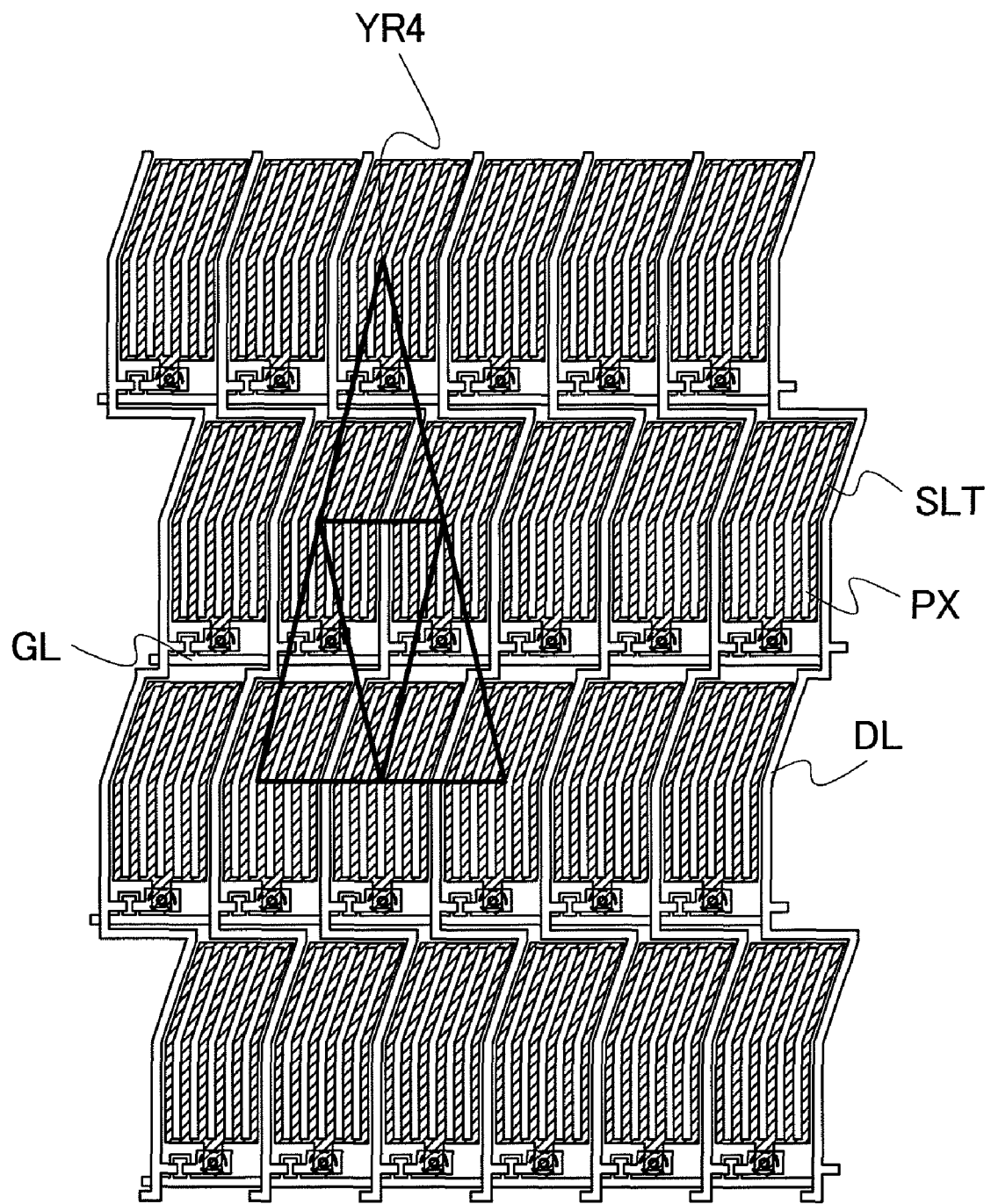
FIG. 10 is a schematic view showing a pixel arrangement of a liquid crystal display panel according to a modification 2 of the embodiment 2 of the present invention.

FIG. 10 is a schematic view showing the pixel arrangement of a liquid crystal display panel according to a modification 2 of the embodiment 2. In the liquid crystal display panel shown in FIG. 10, sub pixels are arranged in accordance with the delta arrangement. As indicated by an arrow YR4 in FIG. 10, positions of centers of gravity of the sub pixels are arranged in accordance with the delta arrangement. In this delta arrangement, when the angle ϕ7 is increased, a region where the same color continuously appears obliquely is formed. Accordingly, it is desirable to set the angle ϕ7 to satisfy the relationship of $|\phi 7| \leq 30°$.

In the explanation of the above-mentioned embodiment 1 and the embodiment 2, the explanation has been made with respect to the case which uses the electrode structure constituted of the pixel electrode (PX) which is formed on the liquid crystal layer (LC) side of the interlayer insulation film (PAS1) and the counter electrode (CT) which is formed on the side of the interlayer insulation film (PAS1) opposite to the liquid crystal layer (LC). However, the electrode structure shown in FIG. 13 may be also used in place of such electrode structure.

Figure 13:
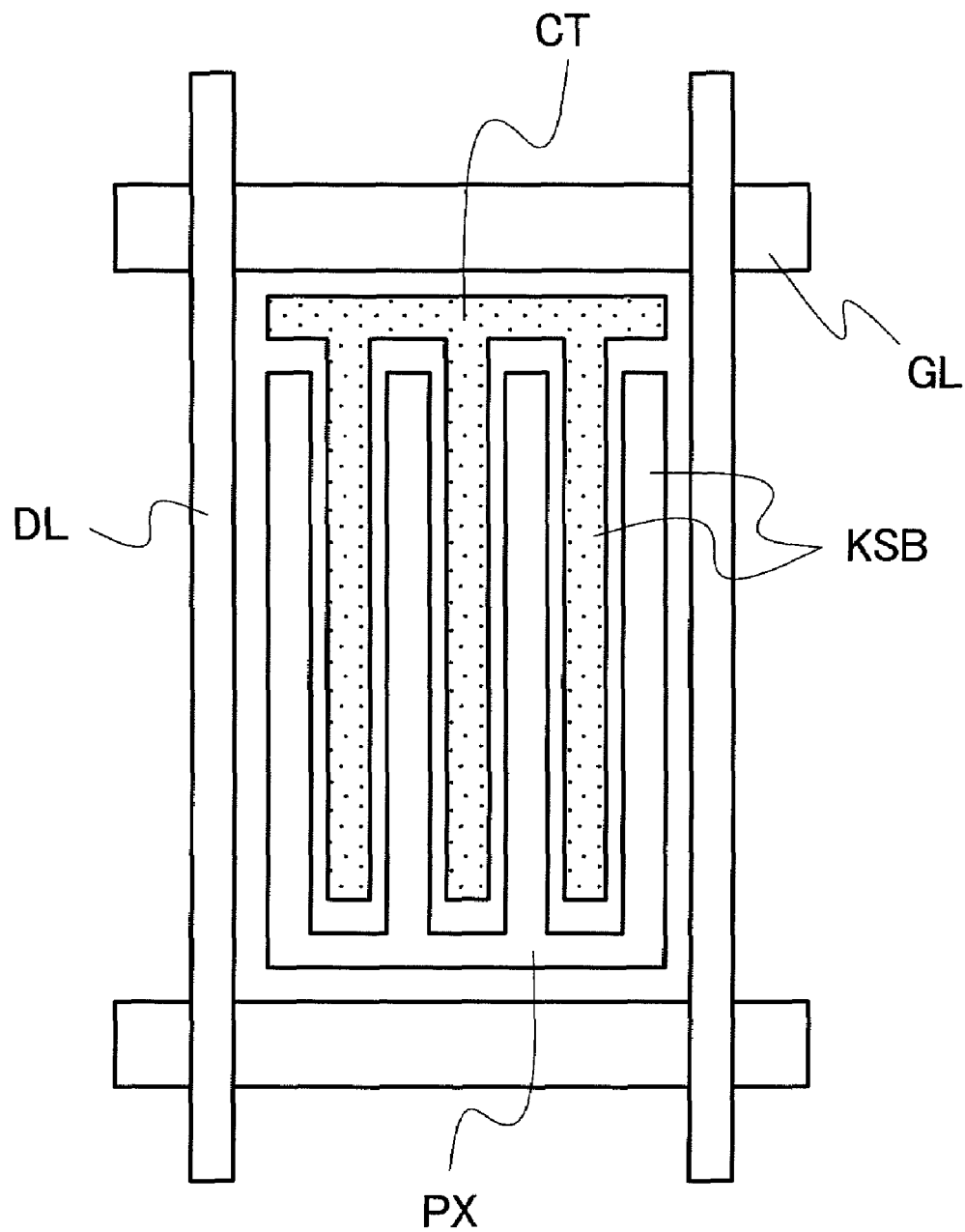
FIG. 13 is a plan view for explaining one example of the electrode structure of a conventional liquid crystal display panel adopting an IPS method.

FIG. 13 is a plan view for explaining another example of the electrode structure of a conventional liquid crystal display panel adopting an IPS method.

The electrode structure shown in FIG. 13 differs from the electrode structures explained heretofore with respect to a point that both of the pixel electrode (PX) and the counter electrode (CT) are formed of an electrode having linear portions (a comb-teeth electrode) (KSB), and the linear portions of the counter electrode (CT) is arranged between the neighboring linear portions of the pixel electrode (PX). Further, the pixel electrodes (PX) and the counter electrodes (CT) may be formed on the same layer or may be formed on different layers by interposing an insulation film between the pixel electrodes (PX) and the counter electrodes (CT).

The electrode structure shown in FIG. 13 may be applied to the embodiment 1 and the embodiment 2 by imparting the suitable inclination to the electrode structure.

Further, in the embodiment 1 and the embodiment 2, the electrodes formed on the liquid crystal layer (LC) side of the interlayer insulation film (PAS1) may be used as the counter electrodes (CT) and the electrodes formed on the side of the interlayer insulation film (PAS1) opposite to the liquid crystal layer (LC) may be used as the pixel electrodes (PX). In this case, the counter electrode (CT) is formed of an electrode having linear portions (for example, an electrode having a plurality of slits (SLT)) and the pixel electrode is formed of a planar electrode.

Further, symbol 11-1 in FIG. 1 may be used to indicate the long sides of the display region (AR) and symbol 11-2 may be used to indicate the short sides of the display region (AR).

Although the invention made by the inventors of the present invention has been specifically explained in conjunction with the embodiments heretofore, it is needless to say that the present invention is not limited by these embodiments and various modifications are conceivable without departing from the gist of the present invention.

What is claimed is:

1. A liquid crystal display device including a liquid crystal display panel which comprises: a first substrate; a second substrate arranged closer to a viewer's side than the first substrate; and positive liquid crystal sandwiched between the first substrate and the second substrate, wherein
   the liquid crystal display panel includes a plurality of sub pixels within a display region,
   each sub pixel of the plurality of sub pixels includes a first electrode formed on the first substrate and a second electrode formed on the first substrate, and
   the liquid crystal display panel is configured to drive the liquid crystal by generating an electric field using the difference in potential between the first electrode and the second electrode, wherein
   the first substrate includes: a first alignment film arranged on a liquid-crystal-side surface thereof; a plurality of video lines configured to input a video signal to the respective sub pixels; and a first polarizer arranged on the surface thereof opposite to the liquid crystal,
   the second substrate includes: a second alignment film arranged on the liquid-crystal-side surface thereof; and a second polarizer arranged on the surface thereof opposite to the liquid crystal,
   the first electrode includes linear portions A and linear portions B which extend in a direction of short sides out of long sides and the short sides of each sub pixel, the video lines extend in a first direction along an arbitrary one side of the display region of the liquid crystal display panel as a whole while being bent locally, and assuming the first direction as a first reference direction and a direction orthogonal to the first direction as a second reference direction, assuming a narrow angle out of intersection angles between the first reference direction and the extension direction of a portion of the video line as θ1, assuming a narrow angle out of intersection angles between the second reference direction and an alignment axis of the second alignment film as θ2, assuming a narrow angle out of intersection angles between the alignment axis of the second alignment film and an extension direction of the linear portions A of the first electrode as θ3, assuming a narrow angle out of intersection angles between the alignment axis of the second alignment film and an extension direction of the linear portions B of the first electrode as θ4, assuming a narrow angle out of intersection angles between the second reference direction and an absorption axis of the second polarizer as θ5, and in measuring the angles θ1 to θ5 within a range from −90° to +90° while setting a clockwise direction as a normal direction, wherein the angle θ1 is measured from the first reference direction, the angles θ2, θ5 are measured from the second reference direction, and the angles θ3, θ4 are measured from the alignment axis of the second alignment film respectively, a sign of the angle θ1 and a sign of the angle θ2 are equal within one sub pixel, a sign of the angle θ3 and a sign of the angle θ4 are opposite to each other within one sub pixel, the angles θ1 of all sub pixels have the same sign, and following formulae (1) to (6) are satisfied in all sub pixels.

$$0° \leq |θ1-θ2| \leq 2° \quad (1)$$

$$10° \leq |θ2| \leq 80° \quad (2)$$

$$1° \leq |θ3| \leq 20° \quad (3)$$

$$1° \leq |θ4| \leq 20° \quad (4)$$

$$0° \leq |θ3-θ4| \leq 2° \quad (5)$$

$$0° \leq |θ2-θ5| \leq 2° \text{ or } 88° \leq |θ2-θ5| \leq 92°. \quad (6)$$

2. A liquid crystal display device according to claim 1, wherein the angle θ2 is set to satisfy a relationship of 10°≤|θ2|≤45°.

3. A liquid crystal display device according to claim 1, wherein assuming a narrow angle out of intersection angles between the second reference direction and an alignment axis of the first alignment film as θ6, assuming a narrow angle out of intersection angles between the second reference direction and an absorption axis of the first polarizer as θ7, and in measuring the angles θ6, θ7 from the second reference direction within a range from −90° to +90° while setting a clockwise direction as a normal direction, a relationship of 0°≤|θ2−θ6|≤2° and a relationship of 89°≤|θ5−θ7|≤91° are satisfied.

4. A liquid crystal display device according to claim 1, wherein the plurality of sub pixels are arranged in the delta arrangement, and the angle θ1 is set to satisfy a relationship of 10°≤|θ1|≤15°.

5. A liquid crystal display device according to claim 1, wherein the video line has a fold-back portion in a boundary portion of two neighboring sub pixels.

6. A liquid crystal display device according to claim 1, wherein the second electrode is an electrode which has linear portions, and has a non-overlapping portion with the first electrode.

7. A liquid crystal display device according to claim 1, wherein the second electrode is a planar electrode which is arranged below the first electrode by way of an insulation film, and overlaps with the first electrode.

8. A liquid crystal display device according to claim 1, wherein the first electrode is a pixel electrode, and the second electrode is a counter electrode.

9. A liquid crystal display device according to claim 1, wherein the first electrode is a counter electrode, and the second electrode is a pixel electrode.

10. A liquid crystal display device including a liquid crystal display panel which comprises: a first substrate; a second substrate arranged closer to a viewer's side than the first substrate; and negative liquid crystal sandwiched between the first electrode and the second electrode, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of video lines configured to input a video signal to the respective sub pixels; and a first polarizer arranged on a surface thereof opposite to the liquid crystal, the second substrate includes: a second alignment film arranged on the liquid-crystal-side surface thereof; and a second polarizer arranged on the surface thereof opposite to the liquid crystal, the first electrode includes linear portions A and linear portions B which extend in a direction along short sides out of long sides and the short sides of each sub pixel, the video lines extend in a first direction along an arbitrary one side of the display region of the liquid crystal display panel as a whole while being bent locally, and assuming the first direction as a first reference direction and a direction orthogonal to the first direction as a second reference direction, assuming a narrow angle out of intersection angles between the first reference direction and the extension direction of a portion of the video line as θ1, assuming a narrow angle out of intersection angles between the second reference direction and a direction orthogonal to an alignment axis of the second alignment film as Θ2, assuming a narrow angle out of intersection angles between a direction orthogonal to the alignment axis of the second alignment film and an extension direction of the linear portions A of the first electrode as Θ3, assuming a narrow angle out of intersection angles between a direction orthogonal to the alignment axis of the second alignment film and an extension direction of the linear portions B of the first electrode as Θ4, assuming a narrow angle out of intersection angles between the second reference direction and an absorption axis of the second polarizer as θ5, and in measuring the angles θ1, Θ2, Θ3, Θ4, θ5 within a range from −90° to +90° while setting a clockwise direction as a normal direction respectively, wherein the angle θ1 is measured from the first reference direction, the angles Θ2, θ5 are measured from the second reference direction, and the angles Θ3, Θ4 are measured from the direction orthogonal to the alignment axis of the second alignment film, a sign of the angle θ1 and a sign of the angle Θ2 are equal within one sub pixel, a sign of the angle Θ3 and a sign of the angle Θ4 are opposite to each other within one sub pixel, the angles θ1 of all sub pixels have the same sign, and following formulae (1) to (6) are satisfied in all sub pixels.

$$0° \leq |θ1-Θ2| \leq 2° \quad (1)$$

$$10° \leq |Θ2| \leq 80° \quad (2)$$

$$1° \leq |Θ3| \leq 20° \quad (3)$$

$$1° \leq |Θ4| \leq 20° \quad (4)$$

$$0° \leq |Θ3-Θ4| \leq 2° \quad (5)$$

$$0° \leq |Θ2-θ5| \leq 2° \text{ or } 88° \leq |Θ2-θ5| \leq 92°. \quad (6)$$

11. A liquid crystal display device according to claim 10, wherein the angle Θ2 is set to satisfy a relationship of $10° \leq |Θ2| \leq 45°$.

12. A liquid crystal display device according to claim 10, wherein
assuming a narrow angle out of intersection angles between the second reference direction and a direction orthogonal to an alignment axis of the first alignment film as Θ6,
assuming a narrow angle out of intersection angles between the second reference direction and an absorption axis of the first polarizer as θ7, and
in measuring the angles Θ6, θ7 from the second reference direction within a range from −90° to +90° while setting a clockwise direction as a normal direction,
a relationship of $0° \leq |Θ2-Θ6| \leq 2°$ and a relationship of $89° \leq |θ5-θ7| \leq 91°$ are satisfied.

13. A liquid crystal display device according to claim 10, wherein the plurality of sub pixels are arranged in the delta arrangement, and the angle θ1 is set to satisfy a relationship of $10° \leq |θ1| \leq 15°$.

14. A liquid crystal display device according to claim 10, wherein the second electrode is an electrode which has linear portions and has a non-overlapping portion with the first electrode.

15. A liquid crystal display device according to claim 10, wherein the second electrode is a planar electrode which is arranged below the first electrode by way of an insulation film and overlaps with the first electrode.

16. A liquid crystal display device according to claim 10, wherein the first electrode is a pixel electrode, and the second electrode is a counter electrode.

17. A liquid crystal display device according to claim 10, wherein the first electrode is a counter electrode, and the second electrode is a pixel electrode.

18. A liquid crystal display device according to any one of claims 8 to 10, wherein
the first substrate includes a plurality of video lines configured to input the video signal to the respective sub pixels,
the video line extends in the reference direction as a whole while being bent locally,
in each sub pixel, each one of the plurality of video lines has a portion A corresponding to the linear portions A of the first electrode and a portion B corresponding to the linear portions B of the first electrode,
the portion A of each video line differs from the portion B of each video line in an inclination angle with respect to the reference direction, and
assuming a narrow angle out of intersection angles between the reference direction and an extension direction of the portion A of each video line as φ7,
assuming a narrow angle out of intersection angles between the reference direction and an extension direction of the portion B of each video line as φ8, and
in measuring the angles φ7, φ8 from the reference direction within a range from −90° to +90° while setting a clockwise direction as a normal direction,
a sign of the angle φ1, a sign of the angle φ7 and a sign of the angle φ8 are all equal in one sub pixel or the sign of the angle φ1 and the sign of the angle φ7 are equal and the angle φ8 is 0° in one sub pixel.

19. A liquid crystal display device according to claim 18, wherein the video line has a fold-back portion in a boundary portion of two neighboring sub pixels.

20. A liquid crystal display device according to claim 19, wherein the angles φ7, φ8 are set to satisfy a relationship of $10° \leq |φ7| \leq 65°$ and a relationship of $0° \leq |φ8| \leq 2°$.

21. A liquid crystal display device according to claim 19, wherein the second electrode is an electrode which has linear portions and has a non-overlapping portion with the first electrode.

22. A liquid crystal display device according to claim 18, wherein the angles φ1, φ2, φ3, φ7, φ8 are set to satisfy a relationship of $0° \leq |(φ1+φ2)-φ7| \leq 2°$ and a relationship of $0° \leq |(φ1+φ3)-φ8| \leq 2°$.

23. A liquid crystal display device including a liquid crystal display panel which comprises: a first substrate; a second substrate arranged closer to a viewer's side than the first substrate; and positive liquid crystal sandwiched between the first substrate and the second substrate, wherein
the liquid crystal display panel includes a plurality of sub pixels within a display region,
each sub pixel of the plurality of sub pixels includes a first electrode formed on the first substrate and a second electrode formed on the first substrate, and
the liquid crystal display panel is configured to drive the liquid crystal by generating an electric field using the difference in potential between the first electrode and the second electrode, wherein
the first substrate includes: a first alignment film arranged on the liquid-crystal-side surface thereof; and a first polarizer arranged on the surface thereof opposite to the liquid crystal,
the second substrate includes: a second alignment film arranged on the liquid-crystal-side surface thereof; and the second polarizer arranged on the surface thereof opposite to the liquid crystal,
the first electrode includes linear portions A and linear portions B which extend in a direction along long sides out of long sides and the short sides of each sub pixel, and
assuming a first direction along an arbitrary one side of the display region as a reference direction,
assuming a narrow angle out of intersection angles between the reference direction and an alignment axis of the second alignment film as φ1, assuming a narrow angle out of intersection angles between the alignment axis of the second alignment film and an extension direction of the linear portions A of the first electrode as $\phi2$, assuming a narrow angle out of intersection angles between the alignment axis of the second alignment film and an extension direction of the linear portions B of the first electrode as $\phi3$, assuming a narrow angle out of intersection angles between the reference direction and an absorption axis of the second polarizer as $\phi4$, and in measuring the angles $\phi1$ to $\phi4$ within a range from $-90°$ to $+90°$ while setting a clockwise direction as a normal direction respectively, wherein the angles $\phi1$, $\phi4$ are measured from the reference direction, and the angles $\phi2$, $\phi3$ are measured from the alignment axis of the second alignment film, a sign of the angle $\phi2$ and a sign of the angle $\phi3$ are opposite to each other within one sub pixel, the angles $\phi1$ of all sub pixels have the same sign, and following formulae (1) to (5) are satisfied in all sub pixels.

$$10° \leq |\phi1| \leq 80° \tag{1}$$

$$1° \leq |\phi2| \leq 20° \tag{2}$$

$$1° \leq |\phi3| \leq 20° \tag{3}$$

$$0° \leq |\phi2-\phi3| \leq 2° \tag{4}$$

$$0° \leq |\phi1-\phi4| \leq 2° \text{ or } 88° \leq |\phi1-\phi4| \leq 92°. \tag{5}$$

24. A liquid crystal display device according to claim 23, wherein the angle $\phi1$ is set to satisfy a relationship of $10° \leq |\phi1| \leq 45°$.

25. A liquid crystal display device according to claim 23, wherein assuming a narrow angle out of intersection angles between the reference direction and an alignment axis of the first alignment film as $\phi5$, assuming a narrow angle out of intersection angles between the reference direction and an absorption axis of the first polarizer as $\phi6$, and in measuring the angles $\phi5$, $\phi6$ from the reference direction within a range from $-90°$ to $+90°$ while setting a clockwise direction as a normal direction, a relationship of $0° \leq |\phi1-\phi5| \leq 2°$ and a relationship of $89° \leq |\phi4-\phi6| \leq 91°$ are satisfied.

26. A liquid crystal display device according to claim 23, wherein the plurality of sub pixels are arranged in the delta arrangement, and the angle $\phi7$ is set to satisfy a relationship of $10° \leq |\phi7| \leq 30°$.

27. A liquid crystal display device according to claim 23, wherein the second electrode is a planar electrode which is arranged below the first electrode by way of an insulation film and overlaps with the first electrode.

28. A liquid crystal display device according to claim 23, wherein the first electrode is a pixel electrode, and the second electrode is a counter electrode.

29. A liquid crystal display device according to claim 23, wherein the first electrode is a counter electrode, and the second electrode is a pixel electrode.

30. A liquid crystal display device including a liquid crystal display panel which comprises: a first substrate; a second substrate arranged closer to a viewer's side than the first substrate; and negative liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; and a first polarizer arranged on a surface thereof opposite to the liquid crystal, the second substrate includes: a second alignment film arranged on the liquid-crystal-side surface thereof; and a second polarizer arranged on the surface thereof opposite to the liquid crystal, the first electrode includes linear portions A and linear portions B which extend in a direction along long sides out of long sides and the short sides of each sub pixel, and assuming a first direction along an arbitrary one side of the display region as a reference direction, assuming a narrow angle out of intersection angles between the reference direction and a direction orthogonal to an alignment axis of the second alignment film as $\Phi1$, assuming a narrow angle out of intersection angles between a direction orthogonal to the alignment axis of the second alignment film and an extension direction of the linear portions A of the first electrode as $\Phi2$, assuming a narrow angle out of intersection angles between the alignment axis of the second alignment film and an extension direction of the linear portions B of the first electrode as $\Phi3$, assuming a narrow angle out of intersection angles between the reference direction and an absorption axis of the second polarizer as $\phi4$, and in measuring the angles $\Phi1$, $\Phi2$, $\Phi3$, $\phi4$ within a range from $-90°$ to $+90°$ while setting a clockwise direction as a normal direction respectively, wherein the angles $\Phi1$, $\phi4$ are measured from the reference direction, and the angles $\Phi2$, $\Phi3$ are measured from a direction orthogonal to the alignment axis of the second alignment film, a sign of the angle $\Phi2$ and a sign of the angle $\Phi3$ are opposite to each other within one sub pixel, the angles $\Phi1$ of all sub pixels have the same sign, and following formulae (1) to (5) are satisfied in all sub pixels.

$$10° \leq |\Phi1| \leq 80° \tag{1}$$

$$1° \leq |\Phi2| \leq 20° \tag{2}$$

$$1° \leq |\Phi3| \leq 20° \tag{3}$$

$$0° \leq |\Phi2-\Phi3| \leq 2° \tag{4}$$

$$0° \leq |\Phi1-\phi4| \leq 2° \text{ or } 88° \leq |\Phi1-\phi4| \leq 92°. \tag{5}$$

31. A liquid crystal display device according to claim 30, wherein the angle $\Phi1$ is set to satisfy a relationship of $10° \leq \Phi1 \leq 45°$.

32. A liquid crystal display device according to claim 30, wherein assuming a narrow angle out of intersection angles between the reference direction and a direction orthogonal to an alignment axis of the first alignment film as $\Phi5$, assuming a narrow angle out of intersection angles between the reference direction and an absorption axis of the first polarizer as $\phi6$, and in measuring the angles $\Phi 5$, $\phi 6$ from the reference direction within a range from $-90°$ to $+90°$ while setting a clockwise direction as a normal direction, a relationship of $0° \leq |\Phi 1 - \Phi 5| \leq 2°$ and a relationship of $89° \leq |\phi 4 - \phi 6| \leq 91°$ are satisfied.

33. A liquid crystal display device according to claim 30, wherein the first substrate includes a plurality of video lines configured to input the video signal to the respective sub pixels, the video line extends in the reference direction as a whole while being bent locally, in each sub pixel, each one of the plurality of video lines has a portion A corresponding to the linear portions A of the first electrode and a portion B corresponding to the linear portions B of the first electrode, the portion A of each video line differs from the portion B of each video line in an inclination angle with respect to the reference direction, and assuming a narrow angle out of intersection angles between the reference direction and an extension direction of the portion A of each video line as $\phi 7$, assuming a narrow angle out of intersection angles between the reference direction and an extension direction of the portion B of each video line as $\phi 8$, and in measuring the angles $\phi 7$, $\phi 8$ from the reference direction within a range from $-90°$ to $+90°$ while setting a clockwise direction as a normal direction, a sign of the angle $\Phi 1$, a sign of the angle $\phi 7$ and a sign of the angle $\phi 8$ are all equal in one sub pixel or the sign of the angle $\Phi 1$ and the sign of the angle $\phi 7$ are equal and the angle $\phi 8$ is $0°$ in one sub pixel.

34. A liquid crystal display device according to claim 33, wherein the angles $\Phi D$, $\Phi 2$, $\Phi 3$, $\phi 7$, $\phi 8$ are set to satisfy a relationship of $0° \leq |(\Phi 1 + \Phi 2) - \phi 7| \leq 2°$ and a relationship of $0° \leq |(\Phi 1 + \Phi 3) - \phi 8| \leq 2°$.

35. A liquid crystal display device according to claim 34, wherein the angles $\phi 7$, $\phi 8$ are set to satisfy a relationship of $10° \leq |\phi 7| \leq 65°$ and a relationship of $0° \leq |\phi 8| \leq 2°$.

36. A liquid crystal display device according to claim 33, wherein the video line has a fold-back portion in a boundary portion of two neighboring sub pixels.

37. A liquid crystal display device according to claim 30, wherein the plurality of sub pixels are arranged in the delta arrangement, and the angle $\phi 7$ is set to satisfy a relationship of $10° \leq |\phi 7| \leq 30°$.

38. A liquid crystal display device according to claim 30, wherein the second electrode is an electrode which has linear portions and has a non-overlapping portion with the first electrode.

39. A liquid crystal display device according to claim 30, wherein the second electrode is a planar electrode which is arranged below the first electrode by way of an insulation film, and overlaps with the first electrode.

40. A liquid crystal display device according to claim 30, wherein the first electrode is the pixel electrode, and the second electrode is the counter electrode.

41. A liquid crystal display device according to claim 30, wherein the first electrode is the counter electrode, and the second electrode is the pixel electrode.

* * * * *